US012713084B2

(12) United States Patent
Xiao et al.

(10) Patent No.: US 12,713,084 B2
(45) Date of Patent: Aug. 18, 2026

(54) REAL-TIME ONLINE LEARNING FOR SHORT-FORM CONTENT RANKING

(71) Applicant: ROKU, INC., San Jose, CA (US)

(72) Inventors: Fei Xiao, San Jose, CA (US); Vineeth Naroju, San Jose, CA (US); Atishay Jain, Mountain View, CA (US); Mukul Gupta, Mountain View, CA (US); Andrey Vlasenko, San Jose, CA (US); Arpit Malhotra, San Jose, CA (US); Jose Sanchez, San Jose, CA (US); Ronica Jethwa, Mountain View, CA (US); Michael Ivanov, San Jose, CA (US); Hrvoje Torbasinovic, San Mateo, CA (US); Kaushik Rangarajan, Santa Clara, CA (US); Abhishek Bambha, Burlingame, CA (US); Rohit Mahto, San Jose, CA (US); Genti Cuni, Los Altos, CA (US); Ellen Hsu, Holmdel, NJ (US); Dan Meropol, Brooklyn, NY (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 19/016,660

(22) Filed: Jan. 10, 2025

(65) Prior Publication Data

US 2026/0136057 A1 May 14, 2026

(30) Foreign Application Priority Data

Nov. 13, 2024 (IN) ............................ 202411087725

(51) Int. Cl.
*H04N 21/262* (2011.01)
*H04N 21/258* (2011.01)
*H04N 21/2668* (2011.01)

(52) U.S. Cl.
CPC . *H04N 21/26258* (2013.01); *H04N 21/25866* (2013.01); *H04N 21/2668* (2013.01)

(58) Field of Classification Search
CPC ....... H04N 21/26258; H04N 21/25866; H04N 21/2668
See application file for complete search history.

(56) References Cited

U.S. PATENT DOCUMENTS

2021/0342383 A1* 11/2021 Manning ............. G06F 16/4387
2023/0209105 A1* 6/2023 Kozak .............. H04N 21/25841 725/93

* cited by examiner

*Primary Examiner* — Sumaiya A Chowdhury
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for real-time online learning for short-form content ranking. An example embodiment operates by receiving a user feedback event that includes user feedback on a short-form content item played using a media device, and publishing a message with the event to a publish-subscribe (pub/sub) topic. Retrieved with a pull operation, the user feedback event from the message is saved to a real-time data store. A recommendation engine is triggered to generate a playlist batch of short-form content recommendations based on the user feedback event. Short-form content items specified in the playlist batch are transmitted to the media device for playback. User feedback on short-form content items in an immediately preceding playlist batch during the same usage session can inform the selections made in the generated playlist batch.

20 Claims, 10 Drawing Sheets

REAL-TIME ONLINE LEARNING FOR SHORT-FORM CONTENT RANKING

CROSS-REFERENCE TO RELATED APPLICATION

This application claims priority to Indian provisional application No. 202411087725 filed Nov. 13, 2024.

FIELD

This disclosure is generally directed to generation of recommendations in real time, and more particularly to real-time online learning for short-form content ranking.

SUMMARY

Provided herein are system, apparatus, article of manufacture, method and/or computer program product embodiments, and/or combinations and sub-combinations thereof, for real-time online learning for short-form content ranking.

An example embodiment operates by receiving a user feedback event that includes user feedback on a short-form content item played using a media device. A message based on the user feedback event is then published to a publish-subscribe (pub/sub) topic via a pub/sub stream, the pub/sub topic comprising queues organized as partitions each held by a broker server of a pub/sub distributed messaging system, each broker server holding one or more partitions. The message is retrieved, e.g., from a broker server, via a pull operation. The user feedback event from the retrieved message is saved to a real-time data store. A short-form content recommendation engine is triggered to generate a playlist batch of short-form content recommendations based on the user feedback event and on other user feedback events retrieved from the real-time data store by the short-form content recommendation engine. Short-form content items specified in the playlist batch are then transmitted to the media device for playback on a short-form content presentation user interface of the media device. The example embodiment operates in real time, such that user feedback on short-form content items in an immediately preceding playlist batch during the same usage session can inform the selections made in the generated playlist batch. For example, the receiving, the publishing, the retrieving, the triggering, and the transmitting can happen within five seconds, e.g., within three seconds, e.g., within one second.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
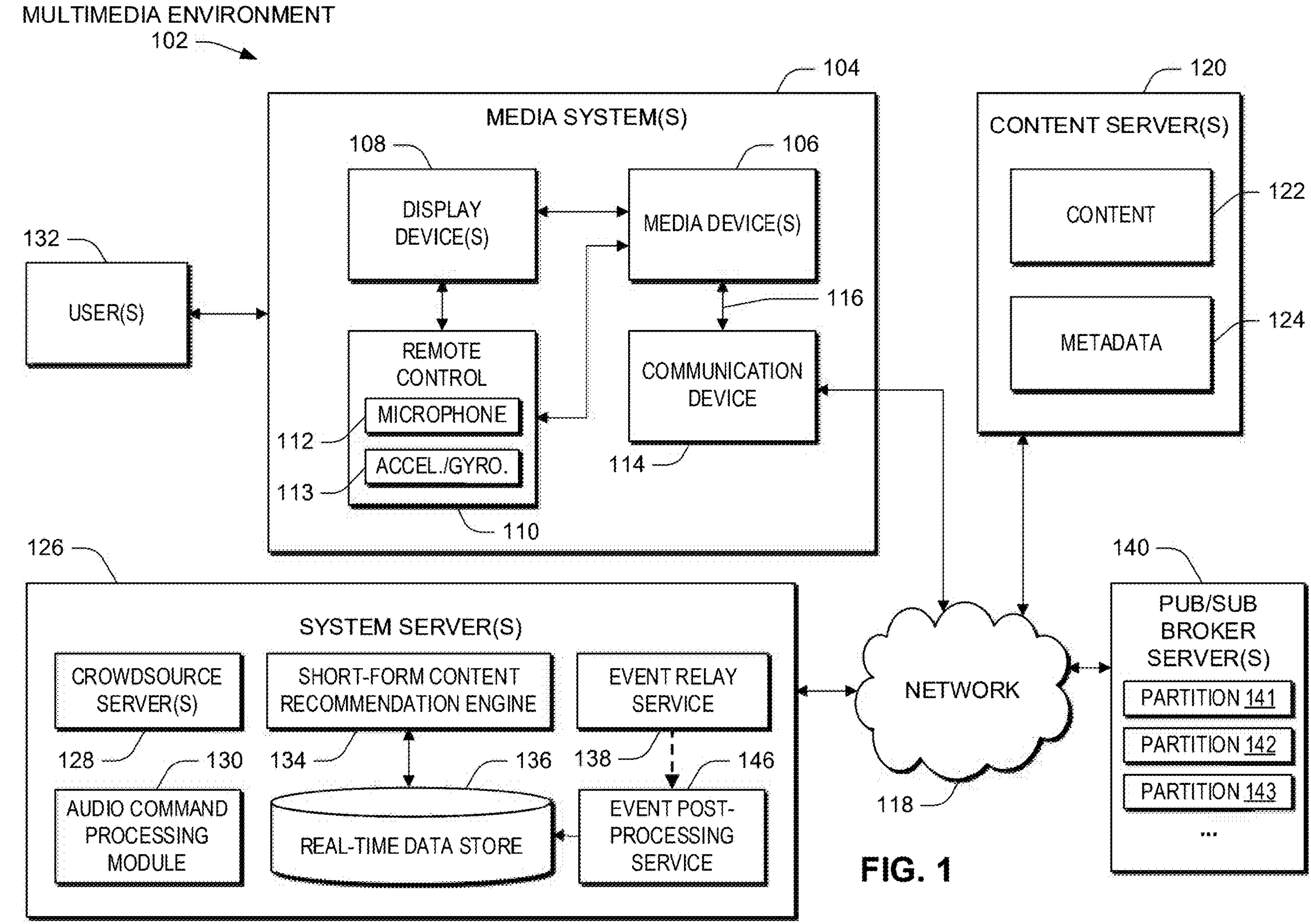
FIG. 1 illustrates a block diagram of a multimedia environment, according to some embodiments.

Provided herein are system, apparatus, device, method and/or computer program product embodiments, and/or combinations and sub-combinations thereof, for real-time online learning for short-form content ranking.

As streaming and downloadable content delivery services continue to supplant traditional media distribution systems such as terrestrial broadcast television, cable television, and theatrical distribution of cinematic products, automated recommendation has become a field of technology unto itself. Systems and methods for generating and presenting recommendations have become a technical field in that they transform a subjective decision-making process (i.e., a human judgment about what content or product might appeal to someone) into an automated, systematic, and data-driven approach. In general, recommendation engines can utilize sophisticated algorithms (e.g., collaborative filtering, content-based filtering, and matrix factorization) to predict what items a user may prefer. These algorithms can process large datasets to identify patterns and correlations between users and items. Recommendation systems and methods can require extensive data processing capabilities to handle user data such as viewing history, preferences, or online behavior. The user history and content interaction datasets involved in recommendation generation are often large, complex, and must be processed efficiently to generate timely and relevant recommendations. Technical challenges are continually posed in developing, improving, and deploying algorithms such as these in real-time environments that involve large-scale computation. Recommendation systems and methods that can reduce computation time and thereby speed the production of recommendations to improve user experiences can represent a technical improvement to the field. Similarly, the development of media content selection user interfaces has become a technical field unto itself. Improvements to the technology of media selection user interfaces which make the user interfaces more efficient, more capable, and improve user experiences represent technological advancements as contributions to the field.

Responsive to the development of large libraries of content that include many thousands or millions of content items for streaming or download, media content providers have simplified the content selection process for their users by developing media content selection user interfaces that present limited subsets of the available content as determined to be most relevant to the tastes, preferences, and interests of the user. Such subsets may be determined, for example, by selection and/or ranking of available content items as recommendations. The recommendations may be generated by a recommendation engine that includes or implements one or more algorithms or models that can take into account such factors as target user preferences, histories, behaviors, and/or demographics; content popularity rankings or change in popularity rankings over a time period across a segment or population of users (e.g., where the segment of users is one to which the target user belongs); and/or a promotion status or value associated with a content item, which may be used to promote content on the service. In some examples, recommended content items may be presented as options in a featured display portion of the media content selection user interface used by the user to interact with the content delivery service and access the content. In some examples, the recommendations rank and/or sort content options for ordered and/or categorized display. The one or more algorithms or models of the content recommendation engine can be, as examples, machine-learning (ML) models such as neural network models or support vector machines, or can be simpler statistical models.

A current context of a user experience can provide important information that can improve the quality of recommendations. One component of user experience current context is the most recent history of user interaction events corresponding to the user profile. These interaction events can be of various kinds depicting the intent of the user while the user continues to stream or download content.

One problem posed by existing content recommendation systems and methods is latency (delay) between the time that user feedback on a viewed content item is given and incorporation of that feedback into generated recommendations for new content items for viewing. Under some conditions, such latency can be on the order of minutes, e.g., fifteen minutes, in some instances. Latency of such magnitude poses less of a problem in the context of long-form content viewing, in which the average length of a feature film or television series episode (e.g., twenty minutes or longer) exceeds the average recommendation learning and generation latency. This is because by the time a viewer has finished viewing long-form content and is ready to be recommended new content for viewing, e.g., by the time an associated media content selection user interface is expected to have refreshed a menu of content selection choices, feedback from the user can already have been received, processed, and incorporated into the new recommendation generation. Fetching the most recent history of interaction events corresponding to interaction with long-form content can pose comparatively little technical challenge as there is enough time to query for this history before a next content item is expected to start streaming or downloading.

Because typical user behavior does not involve consumption of numerous long-form content items in a single usage session, and because user feedback on any one long-form content item (or a few long-form content items) could undesirably bias recommendations in a way not reflective of the larger tastes and preferences of the user, it may be undesirable to provide a refresh of recommendations multiple times, or even once, within a long-form content presentation usage session. Thus, it has been acceptable in long-form content contexts that existing content recommendation systems have an update latency on the order of minutes that does not exceed the time involved in consumption of long-form content.

On the other hand, rapid-fire consumption of numerous short-form content items in a single usage session poses new challenges for the technological field of content recommendation systems. In such short-form content playback contexts, the amount time it takes for a next content item, or next batch of content items in a playlist, to start playing can be significantly less than it is in long-form content playback contexts. For example, in a short-form content playback context, a user may view at least portions of tens, hundreds, or even thousands of short videos, many of them between ten and ninety seconds in length, in a single usage session. Such short-form content items can be presented sequentially with a user interface that allows immediate skipping of items deemed uninteresting by the user, e.g., by the user swiping on a touchscreen interface, clicking a "next" button on a remote control, pressing a corresponding key on a personal computer keyboard, using a gesture, or similar input. Accordingly, users may commonly provide dozens, hundreds, or thousands of feedback signals within a single usage session. Considering that millions of users may be consuming content from a streaming or downloadable content provider contemporaneously, the content provider may be confronted with a stream of hundreds of millions or billions of user feedback signals per hour from short-form content usage.

In view of the above, the present application describes systems, methods, and computer readable media capable of relaying events in real time for usage downstream. The less the latency, the greater the accuracy of generated recommendations, because a recommendation system with lower latency can be better aware of the most recent user interactions, which can help to deduce user intent, likes/dislikes, and content consumption behavior, thus producing more meaningful recommendations. A short-form content recommendation system of sufficiently low latency can advantageously incorporate same-session feedback from the user rapidly enough to permit feedback to influence content item recommendation updates within the same usage session, e.g., repeatedly within the same usage session, and thus to permit adaptation of the playlist batches of content items presented, within a single usage session, e.g., to customize each next batch of presented short-form content items in accordance with the user's tastes and preferences as reflected in the feedback signals from earlier in the same usage session. Due to the minute-order latency involved in content recommendation systems designed for long-form content recommendation, such existing systems may not be easily or beneficially adapted for use in making short-form content recommendations.

Accordingly, systems, methods, and computer-readable media described herein provide short-form content recommendations with average latencies on the order of seconds or faster, e.g., less than one second, thus enabling real-time online learning for short-form content ranking. By "real time," it is meant that a feedback signal from a user can be received, processed, and incorporated into a new playlist batch of recommended short-form content items in less than about five seconds, e.g., less than about three seconds, e.g., less than about two seconds, e.g., less than about one second.

Systems, methods, and computer-readable media described herein can relay interaction events for short-form content from a user's media device to a recommendation service in real time, assisting online-learning of recommender systems to understand the user intent, likes/dislikes in order to recommend the next set of contents. A service can be configured to tap client events from a user device and to use a producer of a publish-subscribe message bus to relay the client events to a distributed, partitioned queue that is referred to as a topic. The events can include information about user interactions with short-form content items, including explicit or implicit "like" or "dislike" signals. The events can then be consumed from the topic, processed, and analyzed to understand the user intent, user likes and dislike, and user content consumption behavior. After understanding the user intent, user likes and dislikes, and user streaming behavior, such information can be used as input to one or more recommendation frameworks that can incorporate machine-learning models, e.g., sequential models such as transformers, to generate and present meaningful short-form content recommendations to the user.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a system installed in a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. Terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smartphone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as Wi-Fi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below. The remote control 110 may include a motion sensor 113 such as one or more accelerometers or gyroscopes. The motion sensor 113 can sense motion of the remote control 110 to produce remote control motion data that can be used, for example, to detect gestures, which can be used as control inputs to the one or more media devices 106, and/or to detect classifiable patterns in the way that the remote control 110 is held and used, which can be used to detect or identify a particular user 132 holding the remote control 110. An account or an implicit account of the multimedia environment 102, with settings and content personalized to the user 132, can be based on the detected or identified particular user 132, as detected or identified using the classifiable patterns derived from the remote control motion data.

The multimedia environment 102 may include one or more content servers 120 (also called content providers, channels or sources 120). Although only one content server 120 is shown in FIG. 1, in practice the multimedia environment 102 may include any number of content servers 120. Each content server 120 may be configured to communicate with network 118. Each content server 120 may store content 122 and metadata 124. Content 122 may include any combination of music, videos, movies, TV programs, short-form video content, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some examples, items of video content stored on and provided by the one or more content servers 120 can each be classified as main-asset content or as short-form content. Items of main-asset content are generally long-form content items, such as feature-length movies or television series episodes. Items of main-asset content can be of any length (regular-speed playback duration), but are generally over twenty minutes in length. Items of short-form content may be of any length, but are generally under twenty minutes in length (e.g., under ninety seconds in length) and/or are associated with an item of main-asset content (e.g., derived from, e.g., edited down from, the associated item of main asset content). Accordingly, short-form content items may be associated with respective long-form content items via metadata 124. As one example, metadata associated with a short-form content item may point to a corresponding long-form content item from which the short-form content item was derived or with which the short-form content item is otherwise associated. As another example, metadata associated with a long-form content item may point to one or more corresponding short-form content items derived from the long-form content item.

A short-form content presentation user interface of a media system 104 can be configured to present to a user 132 a number of short-form content items in rapid succession, e.g., by playing a next short-form content item to the user via a display device 108 (e.g., a television, computer monitor, or smartphone screen) immediately after the ending of a preceding short-form content item, or after having repeated the preceding short-form content item a certain number of times (e.g., twice). In some examples, short-form content items can be advertisements.

The short-form content presentation user interface may display short-form content items in serial fashion in accordance with a playlist of short-form content items. The playlist can be a playlist of recommended short-form content items as may be generated by short-form content recommendation engine 134, as described in greater detail below. The playlist may be presented in batches, with successive batches influenced by user feedback on preceding batches. The short-form content presentation user interface may provide explicit controls (e.g., buttons) or implicit controls (e.g., swipe or gesture controls) that allow a user to perform such functions as indicating a "like" or "dislike" individual short-form content items, to skip a short-form content item (prematurely terminating its playback), to navigate from a short-form content item to an associated main-asset content item, and to navigate between a series of recommended short-form content items in the playlist. The "like" and "dislike" controls can take a number of forms in the short-form content presentation user interface. As but a few examples, a "like" can be signaled by pressing or clicking a "like" button, a heart button, a thumbs-up button, a check-mark button, or similar, and a "dislike" can be signaled by pressing or clicking a "dislike" button, a thumbs-down button, an X-mark button, or similar.

Accordingly, the short-form content presentation user interface may present to a user 132 a plural number (e.g., dozens or hundreds) of short-form content items, one after another, in a single usage session of the short-form content presentation user interface. During the usage session, the user 132 may provide explicit or implicit feedback to the media system 104 indicative of tastes and preferences of the user 132 with regard to the short-form content items presented to the user during the usage session. The multimedia environment 102 may learn, in real-time, from the user feedback to improve recommendations, that is, to present short-form content items to the user during the same usage session that are more likely to cause the user 132 to (a) remain engaged with the usage session, (b) react favorably to the presented short-form content items, e.g., by providing favorable explicit or implicit user feedback, and/or (c) "convert" short-form content items by, for example, navigating to view a main-asset content item associated with the short-form content item or navigating to a sponsor page associated with the short-form content item.

Examples of explicit feedback include a user 132 sending a "like" or "dislike" signal, e.g., by pressing (e.g., clicking) a "like" or "dislike" button presented by the short-form content presentation user interface to expressly signal that the user 132 likes or dislikes a currently playing short-form video. Another example of explicit feedback is a user 132 activating a link embedded in a short-form content item to navigate from the short-form content item to an associated location by pressing (e.g., clicking) a navigation control presented by the short-form content presentation user interface that effectively navigates the user 132 to the associated location. Such deep-linking can include the user 132 choosing to view a parent content item, such as a main-asset content item associated with a short-form content item. Where the short-form content item is an advertisement or sponsored short-form content item, such deep-linking can include the user navigating to a location offering a sponsored product or service for purchase. Deep-linking can thus serve as a proxy for a user "like."

Examples of implicit user feedback can include time based events, such as events indicative that a user played five seconds of a short-form content item before terminating its playback (e.g., to advance to a next content item), or that a user played thirty seconds of the short-form content item before terminating its playback, or that a user 132 permitted the short-form content item to play back for its entire duration. Whereas the former events may be interpreted as negative feedback signals of varying weights, the latter event may be interpreted as a positive feedback signal indicative that the user 132 liked the short-form content item enough to view it in its entirety. A user 132 not permitting a short-form content item to play back for its entire duration can constitute implicit user feedback that may be interpreted as a negative feedback signal that the user 132 did not like the short-form content item enough to view it in its entirety. As one example, for each short-form content item, a threshold can be set as a fraction of the duration of the short-form content item, and a user permitting playback beyond the threshold can be interpreted as a positive feedback signal whereas a user terminating playback prior to the threshold can be interpreted as a negative feedback signal. Thus, for example, if a short-form content item is sixty seconds long, for which the threshold is set at forty-five seconds, and the user skips the short-form content item at the ten-second mark, the resulting signal may be interpreted as the user not liking the short-form content item, whereas if the user skips the short-form content item at the fifty-five second mark, the resulting signal may be interpreted as the user liking the short-form content item. The threshold can be adaptively tuned based on the behavior of the individual user as determined from the user's interactions with short-form content items. For example, if the user is determined to have a tendency to keep skipping short-form content items very soon in their playback, within a certain time duration, but then also views a main-asset content item associated with a short-form content item within the time duration, the threshold can be adjusted downward accordingly for the user. Other implicit events indicative of implicit user feedback can include "playback started," "playback stopped," and "playback exited" events.

Different forms of feedback can have different weights. For example, explicit feedback (e.g., actively pressing a like or dislike button) may be weighted more heavily than implicit feedback, and implicit feedback can have varying degrees of weights. For example, a signal indicating that a user elected to skip a short-form content item within the first five seconds of playback of the short-form content item may be weighted more heavily than a signal indicating that the user elected to skip the short-form content item at between five and ten seconds of playback, which may be weighted more heavily still than a signal indicating that the user elected to skip the short-form content item at between ten and thirty seconds of playback, and so on. Feedback signals can be processed by short-form content recommendation engine 134 and used to improve short-form content item recommendations used to generate successive playlist batches, as described in greater detail below.

The multimedia environment 102 may include one or more system servers 126. The system servers 126 may operate to support the media devices 106 from the cloud. The structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users'viewing experience at particular portions of the movie (for example, when the soundtrack of the movie is difficult to hear), and turning closed captioning off may enhance users'viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The one or more system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the verbal command of the user 132. The audio command processing module 130 may then forward the verbal command back to the media device 106 for processing.

Figure 2:
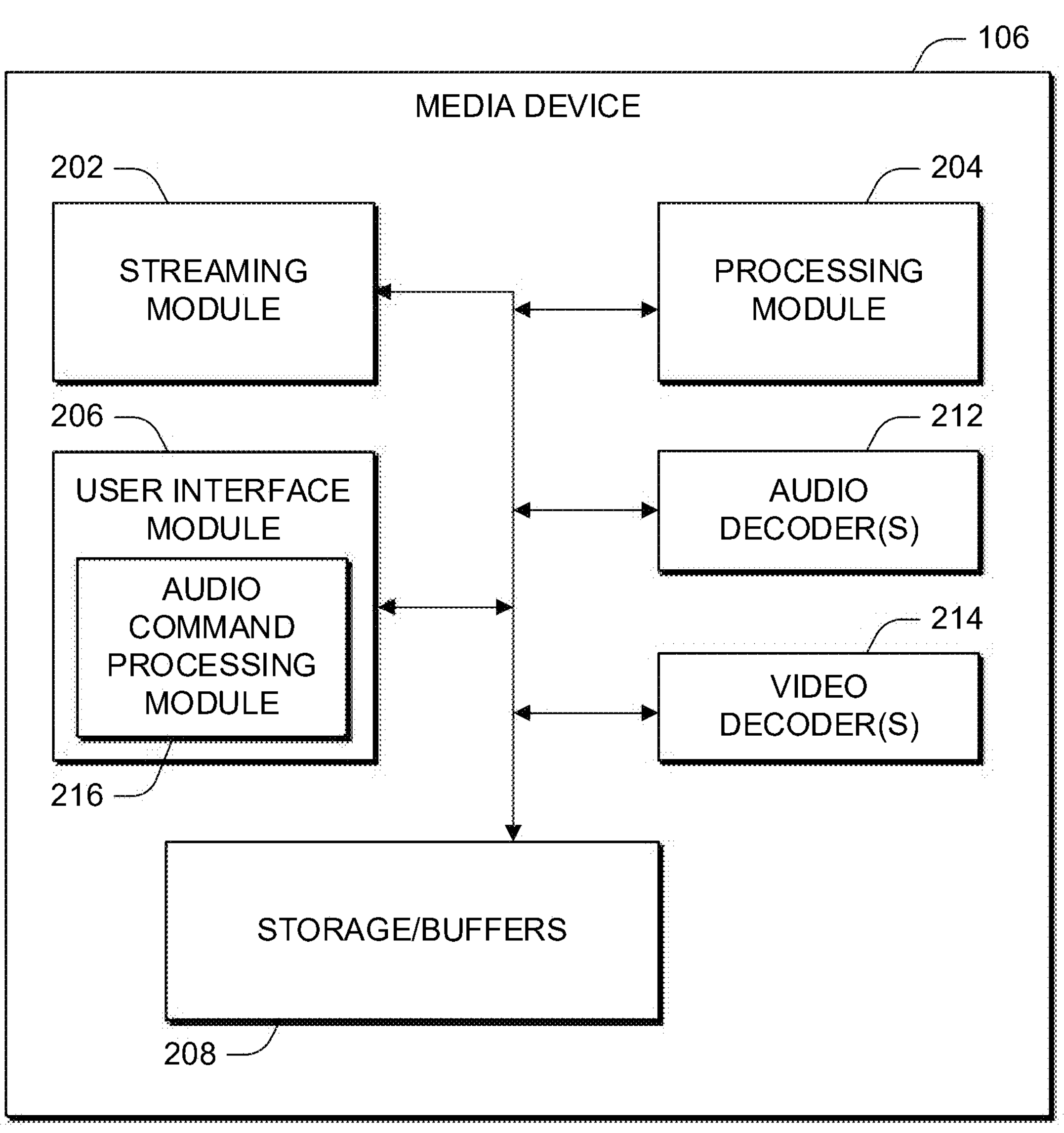
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

The one or more system servers 126 may also include a short-form content recommendation engine 134. The short-form content recommendation engine 134 can be configured to generate playlist batches of recommended short-form content items that can be at least in part customized to the tastes and preferences of an individual user 132. The short-form content recommendation engine 134 can operate in real time to process user feedback as a user 132 interacts with, and provides explicit or implicit feedback signals relating to, short-form content items presented to the user 132 by the short-form content presentation user interface of the media system 104. The short-form content recommendation engine 134 can recommend items of short-form content based on the processed user feedback. The recommended items can be assembled in playlist batches. The one or more system servers 126 can be configured to direct the serial transmission of short-form content items in an assembled playlist batch from content 122 in the one or more content servers 120, via network 118, to the media device 106 corresponding to the user 132 for which the playlist batch is assembled for presentation to the user 132 via the short-form content presentation user interface.

The one or more system servers 126 may also include a real-time data store 136. The real-time data store 136 can store, as examples, features, events, user histories, and lists of content item identifiers, including categorized and/or ranked content item identifiers. As examples, content items can be categorized by genre or topic and/or can be ranked by popularity in the real-time data store 136. Media system 104 may write data, e.g., events related to short-form content item viewing interactions, to the real-time data store 136 using a publish-subscribe (pub/sub) messaging pattern system as an intermediary between the media system 104 and the real-time data store 136. Short-form content recommendation engine 134 may fetch data from the real-time data store 136 and may process the fetched data to generate short-form content recommendations (e.g., playlist batches) for the particular user 132.

The real-time data store 134 can operate using a database designed for applications that strictly require low-latency writes and reads with predictable performance, prioritizing speed over consistency under heavy workloads. The architecture of the database can be designed for sub-millisecond response times, ensuring real-time performance even under high-loads. For example, the real-time data store 136 can use in-memory data storage for indexes and solid state drive (SSDs) for data, allowing for fast access times. The real-time data store 136 can, for example, use key-value data stores and not use complex data structures such as tables, joins, and foreign keys of a relational database. The real-time data store 136 can further be designed for horizontal scaling through distribution of architecture without sharding. The real-time data store 136 can, for example, implement a real-time, high performance NoSQL database, such as Aerospike Database.

The one or more system servers 126 may also include an event relay service 138 and an event post-processing service 146, which can both be a part of the pub/sub messaging pattern system. The event relay service 138 can be configured as a message relay service that receives events, e.g., from the one or more media devices 106, and publishes the events to a pub/sub topic for subsequent pull ingestion by the event post-processing service 146. The event post-processing service 146 can shuttle event data to the real-time data store 136 and can aggregate event data, e.g., by incrementing counters and saving the counters to an accumulated data store, which can be the real-time data store 136 or a parallel data store. In some embodiments, not shown in FIG. 1, the pub/sub publishing functions of the event relay service 138 can be implemented client-side, e.g., in the media device 106, rather than server-side, in the system servers 126.

The multimedia environment 102 may also include one or more servers 140 configured as pub/sub brokers of the pub/sub messaging pattern system. Each of the one or more pub/sub brokers 140 can manage and store at least one partition, which is a messaging queue 141 of the pub/sub messaging pattern system storing user feedback events as records in the partition. FIG. 1 illustrates three partitions 141, 142, 143, but, in different examples, there can be any number of partitions, and each pub/sub broker 140 can manage and store any number of partitions. For example, a single one of the pub/sub brokers 140 may store one primary partition and may also store one or more backup partitions that are each the primary partition of a different pub/sub broker 140. Such redundancy allows any one or more of the pub/sub brokers 140 to become disabled or inactive for a time without completely disabling the pub/sub messaging pattern system.

The partitions 141, 142, 143 are partitions of a pub/sub topic, and the topic can comprise multiple partitions. The event relay service 138 can act as a producer that publishes events as records to the pub/sub topic, and the event post-processing service can act as a consumer that pulls records from the pub/sub topic to process user feedback event data contained in the records. A broken-line arrow between the event relay service 138 and the event post-processing service 146 in FIG. 1 represents the movement of event data from one to the other using the pub/sub brokers 140 as an intermediary relay and buffer. Although some embodiments may be implemented with only a single pub/sub broker 140, the provision of multiple pub/sub brokers 140 provides advantages of distributed parallelism that permit the pub/sub messaging pattern system to scale to accommodate large numbers of event messages, e.g., millions of event messages received from millions of different media systems 104 every minute, while still handling such data on a real-time basis.

In a pub/sub messaging pattern system such as the one implemented in the multimedia environment of FIG. 1 by the event relay service 138, the one or more pub/sub broker servers 140, and the event post-processing service 146, one or multiple publishers, known as producers, publish events into a topic, and one or more subscribers, known as consumers, can subscribe to the topic and receive the events. On the consumer side, a pull model is implemented, by which a subscriber may query a broker to ask to receive more messages, if there are any, as the subscriber has free system resources to pull and process the new messages. This is in contrast to a push model, in which messages are sent to a receiver by the action of the sender whether the receiver has available resources to receive and process them or not. The pub/sub messaging pattern system can be implemented in part using a real-time microbatch processor, such as a streaming pub/sub message bus, e.g., Apache Kafka. Delays on the producer-consumer streaming pipelines can be extremely small, on the order of seconds or fractions of a second, even when the pipelines serve high message volumes, e.g., in the millions of messages per minute. The consumers of the topics can be, for example, Java applications, e.g., an array of Java applications consuming each of the different topics.

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

In some embodiments, the media device 106 and the display device 108 can be integrated in a single mobile device, such as a smartphone, which can be used to display streaming media content items without the use of a remote control 110. In some embodiments (not shown), the short-form content recommendation engine 134, the real-time data store 136, the event relay service 138, and/or the event post-processing service 138 can be integrated into one or more of the one or more content servers 120 rather than in the one or more system servers 126. In various embodiments, various ones of the short-form content recommendation engine 134, the real-time data store 136, the event relay service 138, and/or the event post-processing service 146 can be implemented in different hardware devices, e.g., these elements need not all be implemented on the same one system server 126. For example, these elements can be cloud-based elements distributed among different physical servers.

Real-time Online Learning Pipeline

Figure 3:
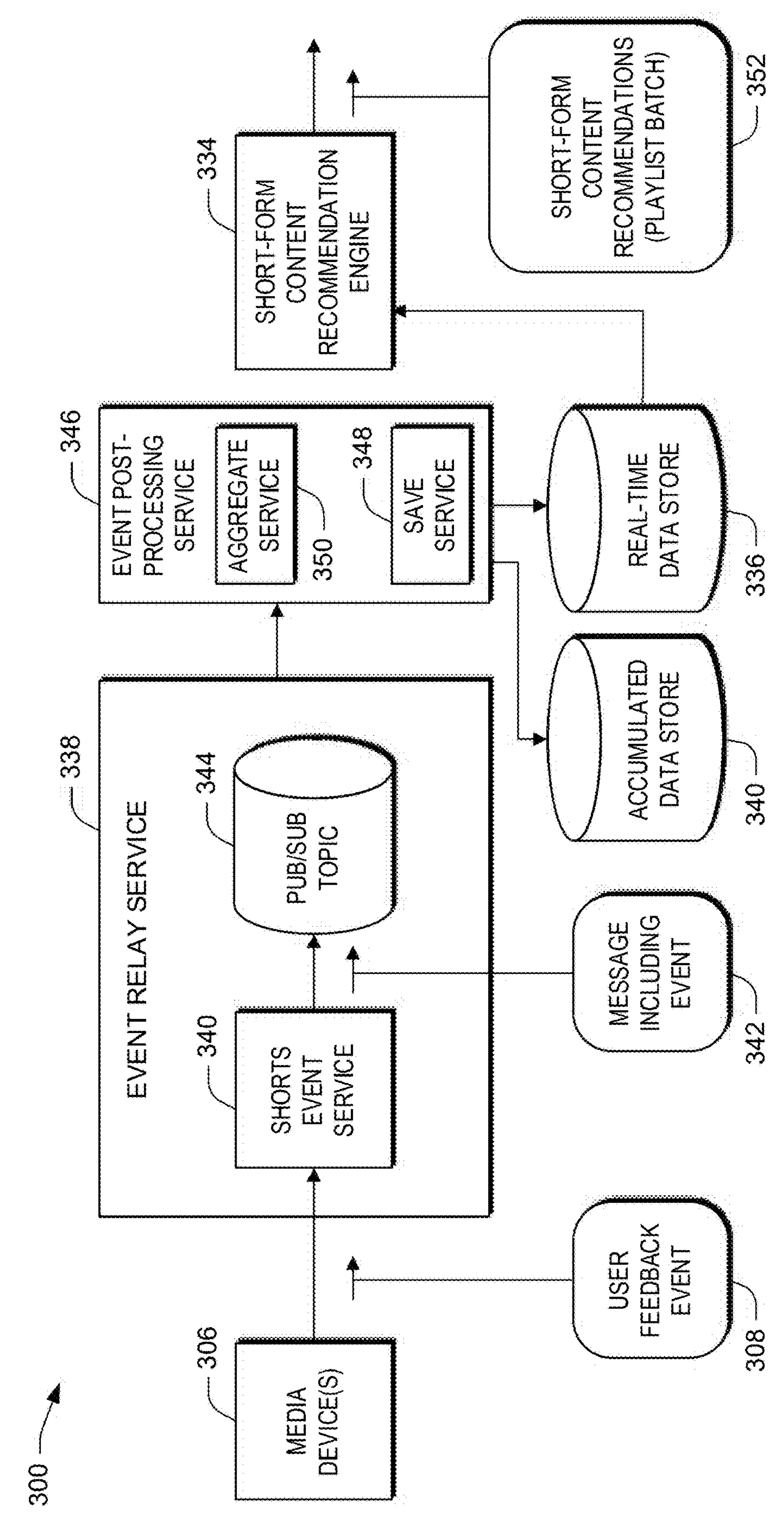
FIG. 3 illustrates a block diagram of a pipeline for real-time online learning for short-form content ranking, according to some embodiments.

The block diagram of FIG. 3 illustrates an example pipeline 300 for real-time online learning for short-form content ranking. The pipeline 300 functions to reduce latency in transforming user feedback signals from users interacting with a short-form content presentation user interface into playlist batches that recommend short-form content items for future presentation by the short-form content presentation user interface.

The pipeline 300 includes a media device 306, which can correspond to an instance of a media device 106 from the media system 104 of the multimedia environment 102 of FIG. 1. The media device 306 can be or can include a set-top box, a smart television, a smartphone, a tablet, a smart watch, a personal computer, or other device configured to provide a user with a media content selection and short-form content presentation user interfaces by which a user may select short-form media content items for playback and may provide explicit or implicit feedback on viewed or partially viewed short-form media content items. Any such section or feedback may be represented as a user feedback event 308, which can be a signal transmitted, e.g., over network 118. The user feedback 308 can represent explicit or implicit user feedback. User feedback event 308 can be, for example, a cue point event, triggered at a certain playback time in a short-form content item, such as when a short-form content item starts or ends, or can be an event triggered by a user action, such as clicking a feedback button in the short-form content presentation user interface. For example, based on a user's feedback signal from the short-form content presentation user interface, the media device 306 can form a message, including parameters that can direct the message to the shorts event service 340 of the event relay service 338. Thus, upon the happening of an event, the media device 306 can automatically direct feedback signals that are related to short-form content items to the shorts event service 340. Feedback signals can be dynamically directed to systems and services other than the shorts event service, as well. For example, a separate service (not shown) in receipt of short-form content item user feedback may act on the short-form content item user feedback in parallel with the shorts event service 340.

The pipeline 300 further includes an event relay service 338, which can correspond to the event relay service 138 of the multimedia environment 102 of FIG. 1. The event relay service 338 can include a shorts event service 340 configured to process the user feedback event 308 to produce a message 342 that includes the event 308, which the event relay service 338 is configured to publish, as a record, to a pub/sub topic 344 via a pub/sub stream. For example, the shorts event service 340 can be configured to receive the user feedback event 308 as a Hypertext Transfer Protocol (HTTP) request from the media device 306 and acts as a relay, putting the HTTP request into the pub/sub stream without any processing of the HTTP request prior to putting it into the pub/sub stream, and without any persistence of the HTTP request within the event relay service 338, so that the event can be placed into the pub/sub stream with minimal delay. Accordingly, the shorts event service 340 can be a producer of the pub/sub topic 344 in the context of the pub/sub messaging system described above with reference to FIG. 1.

The pub/sub topic 344 can comprise a set of queues organized as partitions each held by a broker (e.g., a server) of a pub/sub distributed messaging system (each broker holding one or more partitions). The partitions can be, for example, partitions 141, 142, 143 in FIG. 1, and the brokers can be, for example, pub/sub brokers 140 in FIG. 1. Each partition can hold one or more records numbered as offsets within the respective partition. A record data field assigned as partition key can be used to decide which partition in the pub/sub topic each record should be stored in. High availability of the pub/sub distributed messaging system can be ensured by redundancy of partitions between brokers, e.g., in a cluster of brokers, such that if any one broker storing a partition goes down, at least one other broker contains a backup of the partition and the partition can continue to be accessed by a consumer.

The pipeline 300 further includes an event post-processing service 346, which can correspond to the event post-processing service 146 of the system server 126 of the multimedia environment 102 of FIG. 1. The event post-processing service 346 can be configured as a consumer of the pub/sub topic 344 in the context of the pub/sub messaging system described above with reference to FIG. 1. The event post-processing service can include ingesters (not shown) and a front-end application programming interface (API) (not shown) configured to pull records representative of short-form content interaction user feedback events from the pub/sub topic 344 and ingest the corresponding user event data from the pub/sub topic 344. The event post-processing service 346 can also include a save service 348 and an aggregate service 350. The save service 348 is configured to shuttle the ingested user event data to a real-time data store 336, which can correspond to the real-time data store 136 of the system server 126 of the multimedia environment 102 of FIG. 1. The aggregate service 350 is configured to process the ingested user event data to increment counters (not shown) that effectively provide aggregate data values. As one example, the aggregate service 350 can increment a counter for each short-form content item counting the number of events received for each short-form content item per hour. As another example, a user event indicating that a user has "liked" a short-form content item can be aggregated in a counter assigned to count a total number of "likes" for the short-form content item, either within a specified time period (e.g., number of "likes" in the past twenty-four hours) or for all time. The aggregate service 350 can be configured to save the aggregated values (counter values) to an accumulated data store 340, which can act as a parallel storage for accumulated data. Thus, the event post-processing service 346 can write user feedback event data into multiple destinations. In some embodiments, one or both of the real-time data store 336 and the accumulated data store 340 are configured as one or more Aerospike clusters.

The pub/sub messaging pattern system, of which the event relay service 338 and the event post-processing service 346 can be considered to be a part, can act as both transport and buffer between the media devices 306, which may number in the millions or billions and which may generate, e.g., millions of instances of user feedback event 308 every minute, and the real-time data store 336. The pub/sub messaging pattern system can assist in transporting events produced by the millions of media devices 306 to the real-time data store 336 quickly and efficiently, so that the short-form content recommendation engine 334 can operate on fresh user reaction data. Also, because exposing the real-time data store 336 to a pushed outside write could result in traffic volume spikes that could overwhelming the write bandwidth of the real-time data store 336, the pub/sub messaging pattern system can serve as a buffer in front of the real-time data store 336 to slow down traffic so that traffic spikes do not exhaust resources on the real-time storage.

The pipeline 300 further includes a short-form content recommendation engine 334, which can correspond to the short-form content recommendation engine 134 of the system server 126 of the multimedia environment 102 of FIG. 1. The short-form content recommendation engine 334 can be configured to draw data, including event data or data derived therefrom and indicative of user tastes, preferences, or behaviors, from the real-time data store 336, and based on this data, generate short-form content recommendations 352, e.g., in the form of a playlist batches. Each playlist batch can include a list of content item identifiers, each of which can be, for example, a Universally Unique Identifier (UUID), and each of which can correspond to a short-form content item stored as part of content 122 on a content server 120. Short-form content items listed in a playlist batch can subsequently be streamed or downloaded back to the media device 306 for playback in the short-form content presentation user interface rendered using the media device 306. The short-form content recommendation engine 334 can thereby generate playlist batches 352 that are tailored to the tastes, preferences, and behaviors of the users who receive and consume the short-form content items, e.g., by selecting and/or ranking content items determined to be relevant to the respective users. The short-form content recommendation engine 334 can do so in real time, with a latency on the order of seconds, e.g., less than one second, between the time that a user feedback event 308 is generated by the media device 306 and the time that a new playlist batch 352 is generated based on the feedback signal conveyed by the user feedback event 308.

Short-form Content Selection and Presentation User Interfaces

Figure 4:
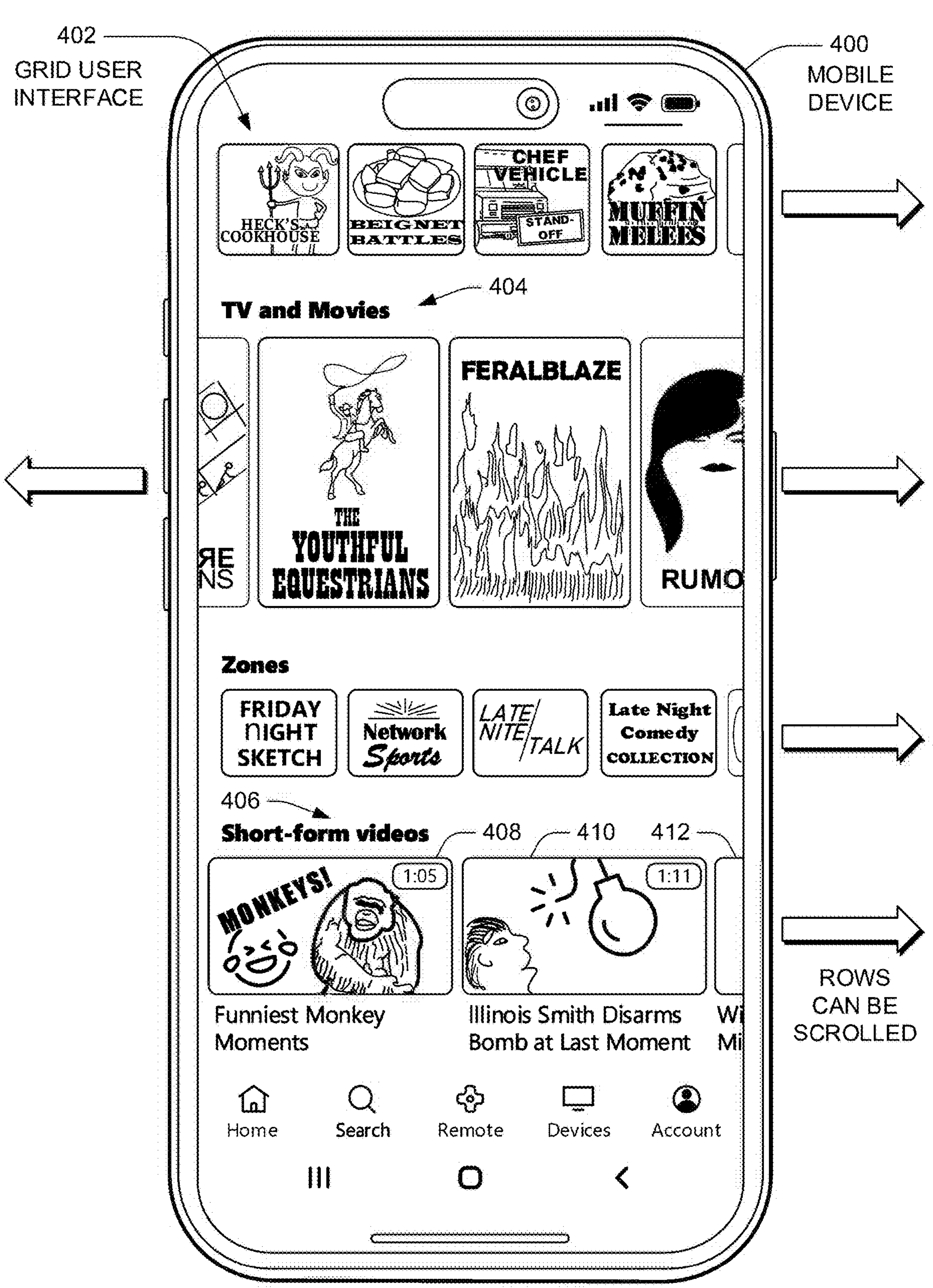
FIG. 4 illustrates an example screen of a content selection user interface, including a short-form content selection user interface, as displayed on a mobile device, according to some embodiments.

FIG. 4 illustrates an example content item selection user interface configured as a grid user interface 402 displayed on a screen of a mobile device 400. The screen of the mobile device 400 can, in some examples, correspond to the display device 108 of the media system 104 of the multimedia environment 102 of FIG. 1. In other examples, the mobile device 400 can correspond to a form of the remote control 110, with a content selection user interface displayed via the mobile device 400 but a content presentation user interface displayed at least in part via another device, such as a television set. The mobile device 400 is depicted as a smartphone in the illustrated example, but could be a different kind of electronic device in other examples (not shown). Although not illustrated in FIG. 4, the grid user interface 402 could also be presented by other types of devices, such as on a monitor of a personal computer or on a television set.

The grid user interface 402 is configured to present media content item options as tiles in different rows corresponding to different categories. In the illustrated example, listed categories include a "TV and movies" category 404 and a "Short-form videos" category 406. Thus, the interface 402 presents for user selection options corresponding to short-form content items along with options corresponding to main-asset content items (e.g., feature-length movies and TV series presented in the "TV and movies" category 404). Within the "Short-form videos" category 406, short-form content item options are presented as tiles 408, 410, 412.

The presentation of the "Short-form videos" category 406 can be configured such that it presents to the user, in the short-form category row 406, ranked options selected from different genres or topics as a starting point for the user to navigate into a short-form content presentation user interface. In the illustrated example, a tile for a first content item option 408 can correspond to a first short-form content item s1 from a comedy genre, a tile for a second content item option 410 can correspond to a second short-form content item s2 from an action genre, and a tile for a third content item option 412 (only partially shown) can correspond to a third short-form content item s3 from a drama genre. Additional genres (or topics) can be represented by other tiles within the row 406, not visible in FIG. 4 as illustrated, but which may become visible to the user by scrolling the row in the user interface, as indicated by the left/right arrows. Genres can include, as examples, action, adventure, anime, biography, comedy, crime, documentary, drama, fantasy, horror, military, mystery, reality, romance, science fiction, sitcom, thriller, and Western. The presented short-form content item option tiles 408, 410, 412 can be presented in a left-to-right order that can represent a ranking of short-form content items s1, s2, s3, where the ranking can be determined based on user tastes, preferences, and behavior as described herein. For example, based on it being determined that a user prefers a comedy genre over action and drama genres, the comedy-genre tile 408 can be presented in preference to (e.g., to the left of) the action-genre tile 410 and the drama-genre tile 412 in the row 406.

The device 400 receiving a signal indicating that the user has pressed or clicked on a tile in category 406, such as one of tiles 408, 410, 412, can trigger the device 400 to enter a short-form content presentation user interface (not shown) configured to play the corresponding selected short-form content item as the first short-form content item in a playlist of short-form content items that the short-form content presentation user interface is configured to play seriatim, one after another. In some examples, the short-form content presentation user interface can be configured to repeat a currently playing short-form content item one or more times before advancing to the next short-form content item in the playlist. The short-form content presentation user interface can include user controls to "like" or "dislike" short-form content items, pause and resume playback, adjust audio volume, skip to a next short-form content item in the playlist, and return to a previous short-form content item in the playlist, as examples. The playlist can be extended indefinitely by being updated in playlist batches from the short-form content recommendation engine 134 or 334.

Within the short-form content presentation user interface, a user can interact with the short-form content items. The user is free to skip a short-form content item that they do not find interesting, and/or can provide explicit feedback in the form of a "like" or "dislike" signal, to help the recommendation system learn from the feedback that the user gives. In some embodiments, the user feedback signals are passed from the media device 106 in FIG. 1 or 306 in FIG. 3 to the event relay service 138 in FIG. 1 or 338 in FIG. 3, e.g., via network 118 in FIG. 1, and proceed to flow through and be processed by the pipeline 300 of FIG. 3 to generate short-form content recommendations 352. In this way, user interest is tapped early, and playlist batches of recommended short-form content items, as personalized to the user, are curated accordingly based on the received user signals. A generated batch of content is presented to the user via the short-form content presentation user interface, based on the user's past interactions with short-form content items presented using the interface.

Once this batch is completed (e.g., once every video in the batch has been viewed or skipped by the user) or is nearly complete (e.g., when only one or two videos in the batch remain), the short-form content presentation user interface causes the media device 106 or 306 to send refresh call to the short-form content recommendation engine 134 or 334 to refresh the batch. This refresh call prompts the short-form content recommendation engine 134 to generate a next batch of short-form content items based on real-time user feedback information gathered in the previous batch. Short-form content items from this next batch are delivered, e.g., from a content server 120 to the media device 106 via network 118, the user interacts with the next-batch short-form content items, and the media device 106 or 306 generates signals sent to the event relay service 138 or 338 to be processed by pipeline 300. In this manner, the short-form content recommendation engine 134 or 334 repeatedly learns about and adapts to the user's tastes, preferences, and behavior, generating new playlist batches responsive to the real-time user feedback. The user may thus be enticed to remain engaged with the short-form content presentation user interface for lengthier amounts of time and to convert viewings of short-form content items into viewings of associated long-form content items from which the short-form content items are derived, and/or to convert viewings of advertisement short-form content items into navigations to locations where advertised items or services may be purchased. For example, an ad-supported platform can show a more targeted advertisement or sponsored short-form video within a next playlist batch, immediately after receiving user feedback signals indicative that the user likes short-form content pertinent to the advertised or sponsored content, providing enhanced, personalized targeting.

Frameworks for Short-form Content Recommendation Generation

Figure 5:
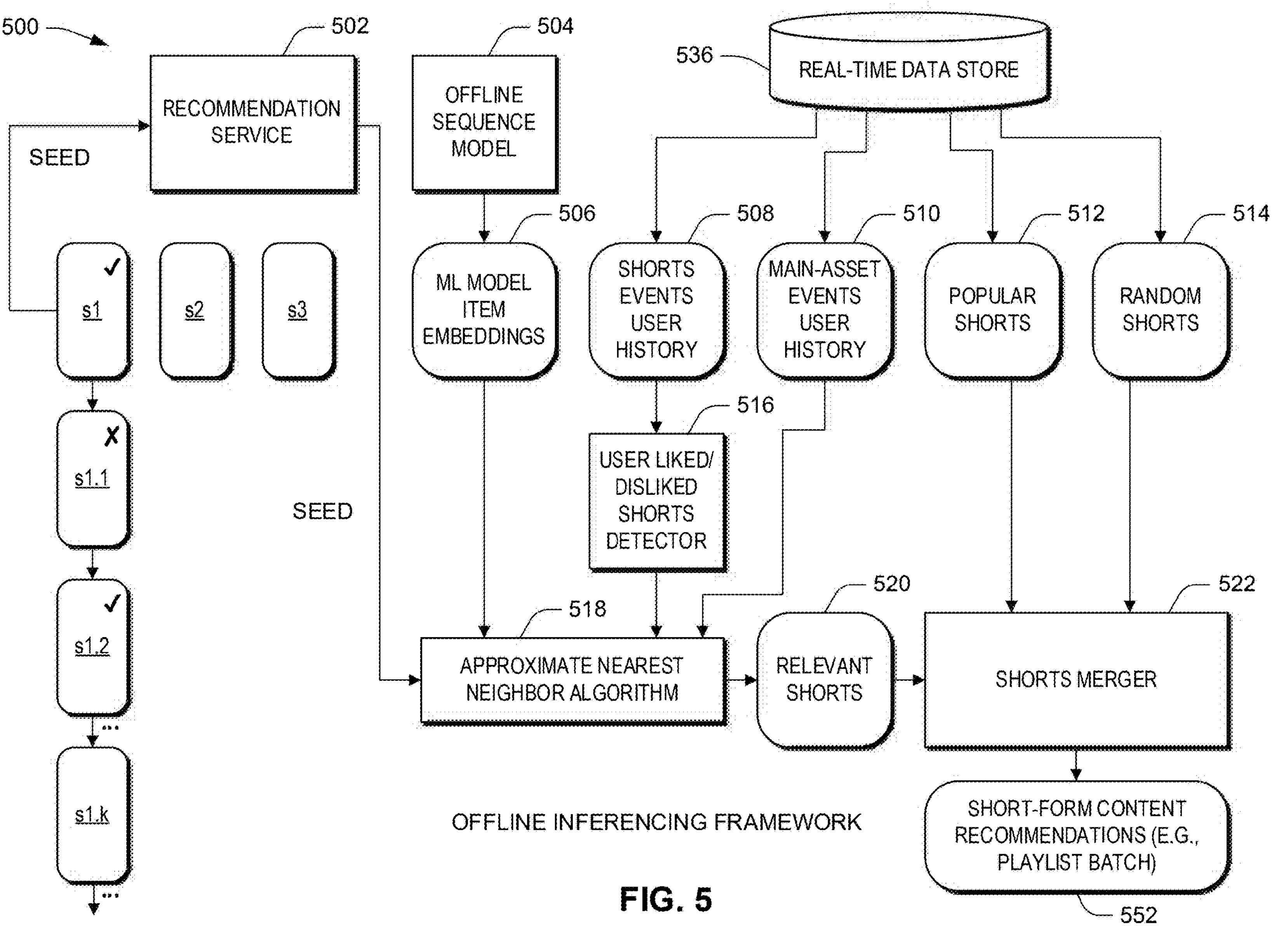
FIG. 5 illustrates a block diagram of an offline inferencing framework for generation of short-form content recommendations, according to some embodiments.
Figure 6:
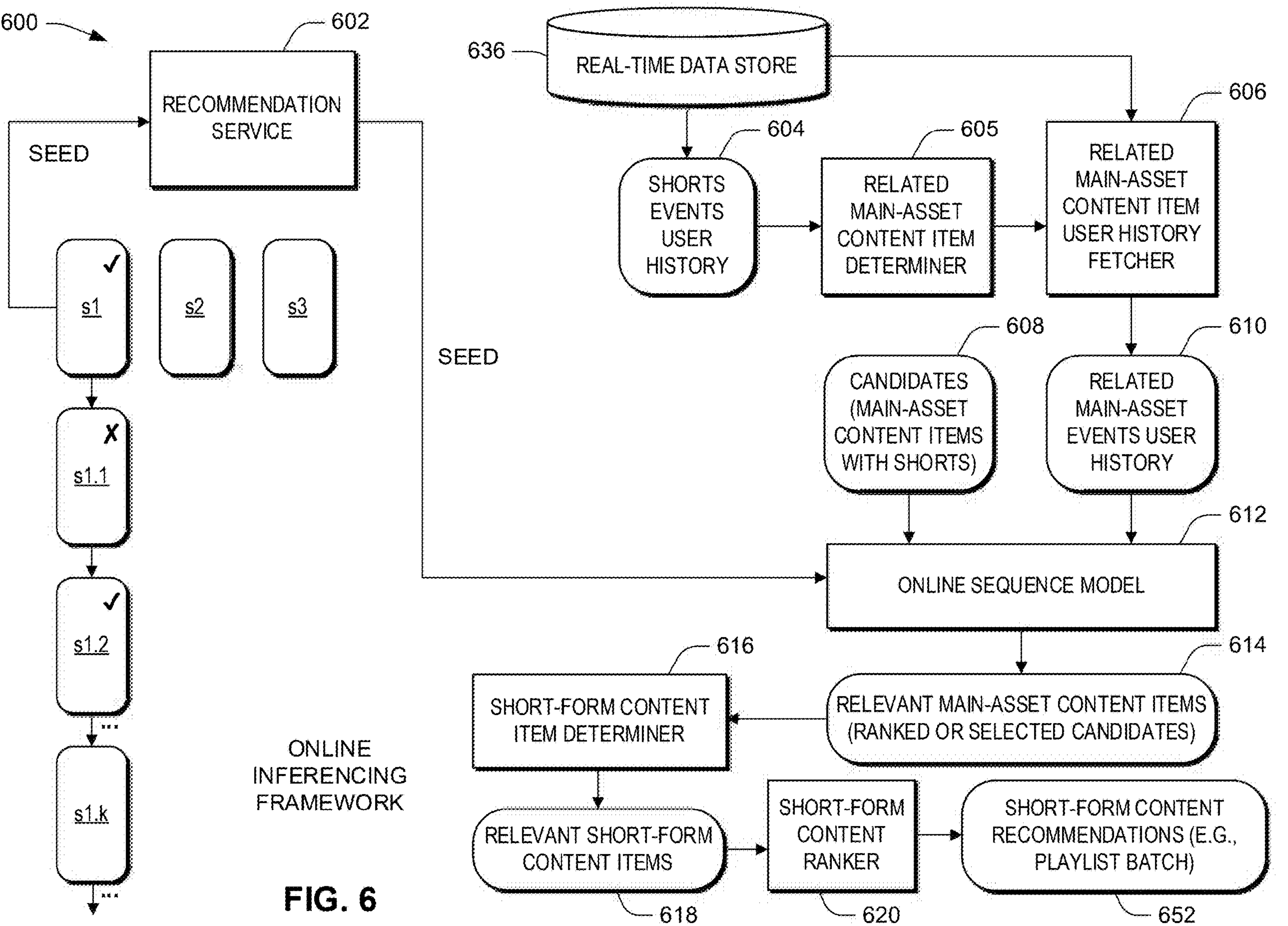
FIG. 6 illustrates a block diagram of an online inferencing framework for generation of short-form content recommendations, according to some embodiments.

FIGS. 5 and 6 illustrate different example frameworks 500, 600 for real-time operation of a short-form content recommendation engine, such as short-form content recommendation engine 136 in FIG. 1 or short-form content recommendation engine 336 in FIG. 3. Each of the example frameworks 500, 600 function to generate short-form content recommendations in real time by comprehending user feedback, including user likes and dislikes, from events that may be received in real time. The user feedback can include explicit signals like "likes" and "dislikes" and implicit signals like how long the user played a certain content item before skipping to the next content item. As described above, the user feedback can also include an indication that a user navigated from the short-form content presentation user interface to view a main-asset content item associated with a currently playing short-form content item, which can be a very strong signal that the user liked the currently playing short-from content item even in the absence of an explicit "like" signal from the user for the short-form content item. Frameworks 500 and 600 can use these signals determine the tastes and preferences of the user in a particular short-form content usage session and quickly adapt to improve recommendations in a next playlist batch.

Each of the example frameworks 500, 600 incorporates at least one ML model (in each case, a sequence model), but the two example frameworks 500, 600 make use of their respective ML models in different ways. Online inferencing framework 600 of FIG. 6 uses its sequence model 612 to select candidate content items online, in real time, to incorporate the real-time short-form content user feedback received by the framework 600 as it is received. By contrast, offline inferencing framework 500 of FIG. 5 uses its sequence model 504 to generate ML model item embeddings offline. ML model inferencing results generated by the offline sequence model 504 are generated before, and independently of, the rest of the real-time processing of user feedback event data, and the offline sequence model 504 is not used for inferencing in real-time to generate recommendations. Instead, in framework 500, inferencing outputs of the sequence model are ranked using an approximate nearest neighbor algorithm 518. Short-form content recommendation engine 134 or 334 can implement offline inferencing framework 500, online inferencing framework 600, some combination of both, or another framework for generating recommendations as may be known in the art.

FIG. 5 illustrates an example offline inferencing framework 500 for generating short-form content recommendations based on real-time user feedback. Offline inferencing framework 500 can include a recommendation service 502, an offline sequence model 504 used for offline inferencing, an approximate nearest neighbor algorithm 518, and a shorts merger 522. The offline inferencing framework 500 can access a real-time data store 536, which can correspond to the real-time data store 136 of FIG. 1 or the real-time data store 336 of FIG. 3, to retrieve user history data, including shorts events user history 508 and main-asset events user history 510, as well as lists of short-form content items, including a list of the most popular shorts 512 across all users of the content service and a list of random shorts 514, e.g., among newer short-form content recently added to the content service.

Short-form content items s1, s2, s3 in FIG. 5 can correspond, for example, to short-form content items represented by short-form content option tiles 408, 410, 412 in grid user interface 402 in FIG. 4. In some examples, each short-form content item s1, s2, s3 can be selected from a different genre or topic. For example, short-form content item s1 can be a comedy short-form content item, short-form content item s2 can be an action short-form content item, and short-form content item s3 can be a drama short-form content item. Thus, a user selection of short-form content item s1 as an initial short-form content item to view can be a strong signal indicative of a user preference for the comedy genre. Although only three short-form content items s1, s2, s3 are illustrated in FIG. 5, different examples can have more than three initially selectable short-form content items, e.g., in scrollable row 406 as illustrated in the grid user interface 402 in FIG. 4. Accordingly, there may be an s4, s5, s6, and so on (not shown).

In the illustrated example, the user selects short-form content item s1 as the initial selection from the short-form content selection user interface. Upon user selection of short-form content item s1, an identifier (e.g., a UUID) for short-form content item s1 can be sent, e.g., by the short-form content selection user interface, to recommendation service 502 as a seed. User selection of short-form content item s1 can trigger playback of short-form content item s1 in the short-form content presentation user interface, as described above. User selection of short-form content item s1 can also trigger generation of a first playlist batch of videos that can include short-form content items s1.1 through s1.*k*. The first playlist batch can be generated, for example, by short-form content recommendation engine 134 as described below, or, absent any user event history upon which to base the first playlist batch, can be based solely on known, determined, or estimated user demographics (e.g., user geographical location) and/or can be random.

Subsequent to playing short-form content item s1, e.g., upon the user skipping short-form content item s1, or the completion of playback of short-form content item s1 one or more times, the short-form content presentation user interface can begin playback of next short-form content item s1.1. Subsequent to playing short-form content item s1.1, e.g., upon the user skipping short-form content item s1.1, or the completion of playback of short-form content item s1.1 one or more times, the short-form content presentation user interface can begin playback of second next short-form content item s1.2. The short-form content presentation user interface can continue this playback sequence through short-form content item s1.*k*, where hyperparameter k is the batch size. Tunable hyperparameter k can be predetermined or adaptively determined in accordance with batch size determination criteria. If k is set too small, user feedback on short-form content videos may be disadvantageously noisy and may inappropriately bias generation of future short-form content recommendations. If k is set too large, short-form content recommendations may be too slow to adapt to user feedback. Accordingly, k can be tuned, e.g., adaptively tuned, to a value that balances these considerations and generates new short-form content item playlist batches of appropriate sizes.

In the illustrated example shown in FIG. 5, the user explicitly selects short-form content item s1 as the entrée into the short-form content presentation usage session, as indicated by the checkmark in the s1 box. The user then explicitly or implicitly dislikes short-form content item s1.1, as indicated by the X-mark in the s1.1 box. The user then explicitly or implicitly likes short-form content item s1.2, as indicated by the checkmark in the s1.2 box. The explicit or implicit likes generate feedback signals that can be provided, with low latency, to the real-time data store 536, e.g., as described above with regard to the pipeline 300 of FIG. 3.

When a media device 106 or 306 of a user has completed or almost completed a current playlist batch, e.g., when the media device 106 begins playback of a last short-form content item in a playlist batch, the short-form content recommendation engine 134 or 334 can be triggered to generate a next playlist batch based on user feedback provided for short-form content items in the current playlist batch during playback of the current playlist batch. The short-form content recommendation engine 134 or 334 can use framework 500 to draw data from the real-time data store 536, including shorts events user history 508, main-asset events user history 510, popular shorts 512, and random shorts 514. The shorts events user history 508 retrieved from the real-time data store 536 can include, in the illustrated example, the user's "dislike" of short-form content item s1.1 and the user's "like" of short-form content item s1.2, and can incorporate this feedback even if the user only provided this feedback within the last few seconds. The main-asset events user history 510 can include data related to the user's interaction with main-asset content items, such as feature-length movies and television series episodes. The main-asset events user history 510 may contain user history data useful to determining short-form content user tastes and interests even for users that have not previously interacted with much or any short-form content.

User liked/disliked shorts detector 516 is configured to process and analyze signal data from the shorts events user history 508 to interpret whether and how much a user liked or disliked each short-form content item presented to the user. For example, user liked/disliked shorts detector 516 can apply adaptive time thresholds, as described above, and weights, which can also be adaptive based on user behavior, to make like/dislike determinations from implicit user feedback signals, and can reconcile potentially conflicting signals. For example, although an early user playback termination of a short-form content item may ordinarily be interpreted as a signal that the user disliked the short-form content item, it may be given reduced weight or disregarded based on the signal being from a second or subsequent playback of the short-form content item, especially where one or more signals from the initial playback of the same short-form content item indicated that the user liked the short-form content item.

Framework 500 can implement an approximate nearest neighbor algorithm 518 to determine user-personalized relevant shorts 520 based on the shorts events user history 508 for the user (as processed by the user liked/disliked shorts detector 516) and the main-asset events user history 510. The approximate nearest neighbor algorithm 518 can also include as input the seed as provided by recommendation service 502. As described above, the seed can be an identifier for the first short-form content item selected by the user (s1 in the illustrated example), which can, for example, be indicative as to a preferred genre or topic of the user. Information about a preferred genre or topic can help the approximate nearest neighbor algorithm provide more relevant or short-form content recommendations.

An embedding (e.g., a vector arranged as a sequence of numbers that represent a point in a multi-dimensional space) can be used to represent the underlying meaning of an unstructured data item, such as a short-form content item and its associated metadata, in a format that can be more easily understood and manipulated by computational models than could be the unstructured data itself. Machine-learning models can transform unstructured inputs into embeddings that can encode semantic nuances decipherable by algorithms. The spatial orientations of different embeddings with respect to each other can signify associations or relationships between the unstructured data items that the embeddings represent. The closer together that two embeddings are to each other as points in multidimensional space, the more similar their respective unstructured data items (e.g., short-form content items) can be considered to be. A Euclidian distance or, more efficiently, a cosine similarity can be used to determine distances between embeddings and to determine nearest neighbors to a given query embedding.

A nearest neighbor search algorithm can be used to identify the nearest embeddings to a given query embedding. As a set of embeddings increases in number or in dimensions, exact distance computations can become so complex as to be impractical or inefficient, so that a complete and exact nearest neighbor algorithm can become intractable. The approximate nearest neighbor algorithm 518 can bypass certain sections of the search space or terminate early once a satisfactory match is identified, providing fast searches with lower computational requirements as compared to a complete and exact nearest neighbor algorithm. Techniques available to narrow the focus of a given similarity search include locality-sensitive hashing (LSH), hierarchical navigable small worlds (HNSW), and product quantization. Available approximate nearest neighbor search algorithms can make use of graphical-processing-unit-based (GPU-based) indexes, and can provide mechanisms to read and write indexes to disk efficiently. In some examples, to avoid repetitive presentation of short-form content items, the approximate nearest neighbor algorithm 518 can also be configured not to select or rank highly any recently presented short-form content items, as indicated by the shorts events user history 508.

ML model item embeddings 506 are each individually representative of short-form content items (or main-asset content items, in some examples). A user can be determined to like a certain type of content, where the type of content is represented by a concentration of content items in a portion (subspace) of the vector space. Similar short-form content items assumed to align with the user's tastes and preferences can then be fetched from that subspace for inclusion in a next playlist batch. For example, the approximate nearest neighbor algorithm 518 can index the hash map represented by the ML model item embeddings 506. Based on user reaction data, the short-form content recommendation engine can modify how short-form content items are fetched, by, in effect, adjusting the location, contours, and boundaries of the subspace from which short-form content items are fetched. As examples, implicit or explicit user "likes" can determine query embeddings within the space defined by the ML model item embeddings 506 from which approximate nearest neighbor algorithm 518 may select nearest neighbors as relevant shorts 520, and implicit or explicit user "dislikes" can prune embeddings from the space and/or can attenuate propensities of the approximate nearest neighbor algorithm 518 to select neighbors of the query embeddings as relevant shorts 520. This functioning can ensure that the kinds of short-form content that the user dislikes are not selected as relevant shorts 520.

Offline sequence model 504 is an ML model that can be trained, using short-form content item metadata, long-form content item metadata, and/or user feedback events, to generate ML model item embeddings 506, e.g., in the form of a hash map that maps available short-form content items in the library of the media content service to corresponding embeddings that semantically capture or represent respective short-form content items. Offline sequence model 504 can be configured to do so less frequently than each request for a new playlist batch. For example, the offline sequence model 504 can be configured to generate ML model item embeddings 506 only once per day or less frequently. For example, the ML model item embeddings can be generated at a time of day chosen as a time when the fewest new user feedback events are generated, or otherwise at a time of day when it is most likely that the greatest number of user feedback events have been captured. It does not materially adversely affect the functioning of offline inferencing framework 500 that the ML model item embeddings 506 do not capture the most recent user feedback events, e.g., over the last few seconds or minutes, in real time. The generated ML model item embeddings 506 in effect compose a space from which relevant shorts 520 (identifiers for relevant short-form content items) are drawn by the operation of the approximate nearest neighbor algorithm 518. ML model thus learns which short-form content items are similar, and which short-form content items are dissimilar, to produce ML model item embeddings 506. In some examples, not only short-form content items are represented by embeddings of the ML model item embeddings 506, but main-asset content items are represented by embeddings of the ML model item embeddings 506 also. In some examples, offline sequence model 504 can further be trained using short-form and/or long-form content, e.g., using audio data from short-form and/or long-form content, textual data from short-form and/or long-form content, and/or video data from short-form and/or long-form content.

The design of the short-form content selection user interface, such as grid user interface 400 shown in FIG. 4, can further influence the selection of relevant shorts 520 from among those described by the ML model item embeddings 506 by the approximate nearest neighbor algorithm 518. Different short-form content item option tiles in the short-form content selection user interface can correspond to different genres or topics. When a user makes an initial selection of a short-form content item from the selection user interface, the genre or topic of the initial selection can influence the selection of following short-form content items. For example, the selection of short-form content item s1 in FIG. 5 can in part determine what short-form content items are selected as s1.1, s1.2, etc. For example, short-form content items played subsequent to an initially selected short-form content item can be drawn from the genre or topic of the initially selected short-form content item. For example, based on short-form content item s1 in FIG. 5 being a comedy short, short form content items s1.1, s1.2, etc. can also be comedy shorts. To effectuate this genre- or topic-specific selection, approximate nearest neighbor algorithm 518 can be provided with the seed from the recommendation service 502. The seed can be provided via real-time pipeline 300 to ensure that the seed is received as a real-time signal, notwithstanding that millions of seed signals may be generated every minute by a recommendation system supporting millions of users.

Providing the seed from the recommendation service 502 to the approximate nearest neighbor algorithm, separately from the approximate nearest neighbor algorithm's processing of shorts events user history 508, can have two benefits. First, although the shorts events user history 508 is provided in real-time or near real-time, any small amount of latency in processing which item a user clicked might prevent that signal from being present in the shorts events user history 508. The initial user selection of a preferred genre or topic via the initial user selection of a first short-form content item option tile in the short-form content selection user interface can be a very strong explicit signal about a user's genre or topic preferences. Providing the seed to the approximate nearest neighbor algorithm separately from the shorts events user history 508 ensures that the initial selection information is not lost in the generated recommendations 522. Second, particularly as batch size k increases, the explicit signal of the initial selection may be lost in the preponderance of other user feedback signals. Providing the seed to the approximate nearest neighbor algorithm separately from the shorts events user history 508 can reinforce its importance in the execution of the approximate nearest neighbor algorithm 518. In an example in which there are three different clusters in an embedding space provided by ML model item embeddings 506, one cluster for comedy, one cluster for action, and one cluster for drama, seeding the approximate nearest neighbor algorithm 518 with a comedy embedding and directing the approximate nearest neighbor algorithm 518 to fetch a top ten content items can result in an output of relevant shorts 520 from the comedy cluster and thus, for example, associated with comedy movies.

By using real-time retrieval of fresh user reaction data (in shorts events user history 508) from real-time data store 536, by using real-time execution of approximate nearest neighbor algorithm 518, and by using the seed input indicative of a genre or topic of short-form content initially selected from a short-form content selection user interface, offline inferencing framework 500 is able to analyze the past few seconds or past few minutes of user reactions to determine what short-form content items a user liked or disliked in real time. Offline inferencing framework 500 is able perform this analysis and recommendation generation in real-time by post-processing events received the event relay service 138 or 338 to fetch from ML model item embeddings 506 short-form content items similar to those liked and dissimilar to those disliked by the user. Although the similarity and dissimilarity is defined by the offline sequence model 504, offline sequence model 504 need not be trained or inferenced in real time for the framework 500 to operate in real time. The training and inferencing of offline sequence model 504 can take place in a separate pipeline from that shown in FIG. 5, which is not illustrated here. Accordingly, framework 500 operates in real time to determine personalized user-relevant short-form content items (relevant shorts 520), even though offline inferencing framework 500 does not execute an ML model for inferencing in real time.

The offline sequence model 504 can be implemented as any type of sequence model. As one example, the offline sequence model 504 can be implemented as a deep neural network, such as a short-term attention memory priority (STAMP) model, which is an intersection-based sequence model. As another example, the offline sequence model 504 can be implemented as a transformer network, which uses an attention mechanism.

The output of the approximate nearest neighbor algorithm 518, relevant shorts 520, can be a ranked list of recommended short-form content item identifiers that can include a larger number of recommended short-form content item identifiers than the playlist batch size k. That is, relevant shorts 520 can include more user-personalized recommendations than are ultimately assembled for short-form content recommendations 552. For example, the number of recommended short-form content item identifiers in relevant shorts 520 can be about ten times k. As examples, the number of recommended short-form content item identifiers in relevant shorts 520 can be one hundred, two hundred, four hundred, five hundred, or one thousand.

In addition to determining short-form content recommendations 552 based on personalized user-relevant short-form content items, offline inferencing framework 500 can base its short-form content recommendations 552 on popularity of short-form content items and on content exploration considerations. Accordingly, offline inferencing framework 500 can retrieve popular shorts 512 and random shorts 514 (e.g., lists of short-form content identifiers for each) from real-time data store 536 and can combine popular shorts 512 and random shorts 514 with relevant shorts 520 using shorts merger 522 to generate short-form content recommendations 522. Inclusion of random shorts 514 in recommendations 552 can drive user exploration of new or little-viewed content items. Content new to the library of the media content service may have little user data associated with it, and thus may have little or no chance of appearing in the relevant shorts 520 or the popular shorts 512. Accordingly, random shorts 514 can, in some examples, be selected from among newer content items to try to give these newer content items impressions, test their conversion rates, and build user history data for them. In some examples, random shorts 514 can include promoted or sponsored content or advertisements.

Shorts merger 522 can be configured to mix relevant shorts 520, popular shorts 512, and random shorts 514 in different proportions. As one example, shorts merger 522 can be configured to generate a playlist batch 552 that is sixty percent relevant shorts 520, twenty-five percent popular shorts 512, and fifteen percent random shorts 514. As another example, shorts merger 522 can be configured to generate a playlist batch 552 that is fifty percent relevant shorts 520, twenty-five percent popular shorts 512, and twenty-five percent random shorts 514. Other proportions are possible and may be customized to the user. For example, based on user feedback indicating that the user has strong preferences for those shorts in a playlist batch 552 that are among the random shorts 514, shorts merger 522 can be configured to increase the proportion of random shorts 514 delivered in a next playlist batch 552. Shorts merger 522 can prune the number of relevant shorts 520, e.g., by selecting only the top-ranked ones short-form content item identifiers of the relevant shorts 520 until the relevant shorts proportion is satisfied. In this way, offline inferencing framework 500 can balance freshness and diversity with relevancy of short-form content recommendations.

Short-form content recommendations 552 can take the form of a playlist batch of k different short-form content item identifiers. For example, a playlist batch can comprise at least ten different short-form content item identifiers. For example, a playlist batch can comprise at least twenty different short-form content item identifiers. For example, a playlist batch can comprise at least forty different short-form content item identifiers. Batch size k can be a tunable hyperparameter that can be adjusted for all users of the content delivery service or customized for individual users of the content delivery service based on information about usage and/or user feedback signal noisiness. For example, the batch size k can be increased for users that provide few or no explicit signals, e.g., for users who supply explicit signals for less than fifty percent of the short-form content items presented, or for users who supply explicit signals for less than twenty percent of the short-form content items presented. As soon as the kth short-form content item is viewed by a user, a new playlist batch of k short-form content items can be made available to the short-form content presentation user interface using offline inferencing framework 500, thereby providing an effectively infinite playlist of recommended short-form content items, with each playlist batch being influenced by user feedback given during the playback of the previous playlist batch.

Offline inferencing framework 500 can be configured to bias more recent feedback in its generation of recommendations, so that user feedback given during the playback of the previous playlist batch is weighted more heavily than earlier user feedback in the generation of the recommendations. However, online inferencing framework 600 can be even more sensitive to more recent user feedback than offline inferencing framework 500.

FIG. 6 illustrates an example online inferencing framework 600 for generating short-form content recommendations based on real-time user feedback. Some aspects of online inferencing framework 600 are similar to those in offline inferencing framework 500 and are not described again below. As one example, real-time data store 636 can correspond to real-time data store 136 in FIG. 1 and/or real-time data store 336 in FIG. 3, and thus can function similarly to real-time data store 536 in FIG. 5. As another example, online inferencing framework 600 can receive a seed from a recommendation service 602, the seed being a content item identifier representative of an initial user selection of a content item option tile in a short-form content selection user interface, in the same way that offline inferencing framework 500 can receive a seed from recommendation service 502. The details of the user selection of an initial short-form content item, e.g., s1 in the illustrated example, are therefore the same in online inferencing framework 600 as they are for offline inferencing framework 500, as described above, and are not repeated in the below description. However, online inferencing framework 600 has several important differences from offline inferencing framework 500.

One such difference is that, whereas offline inferencing framework 500 performs its machine-learning model (e.g., sequence model) inferencing offline, separately from the real-time process executed by the framework 500 to generate short-form content recommendations 552 based on the latest user feedback events in shorts events user history 508, online inferencing framework 600 performs machine-learning model inferencing in real time as part of the generation of short-form content recommendations 652 based on the latest user feedback events in shorts events user history 604. However, online inferencing framework 600 does not use the shorts events user history 604 directly as part of the model inference. Whereas in offline inferencing framework 500 one, both shorts interactions 508 and main-asset interactions 510 were provided as inputs to the approximate nearest neighbor algorithm 518 to determine relevant shorts 520, in online inferencing framework 600, inferencing is based on a main-asset content item user history 610 for main-asset content items that are related to short-form content items interacted with by the user. Accordingly, online inferencing framework 600 in effect makes long-form content recommendations and then generates short-form content recommendations based on the long-form content recommendations.

In FIG. 6, short-form content items s1, s2, s3, may respectively relate to or be associated with main-asset content items (e.g., feature-length movies or television series) m1, m2, m3. For example, short-form content item s1 may be derived from (e.g., excerpted from) movie m1, and short-form content item s2 may be derived from movie m2, and short-form content item s3 may be derived from movie m3. Each main-asset content item may have a plurality of short-form content items associated with it in the library of the media content provider. As in FIG. 5, short-form content items s1, s2, s3 may be selected each from a different genre or topic. Also as in FIG. 5, user interactions with short-form content items s1, s1.1, s1.2, etc. in FIG. 6 may be forwarded via a real-time pipeline, such as pipeline 300 shown in FIG. 3, to the real-time data store 636 and retrieved by the online inferencing framework 600 as shorts events user history 604. This shorts events user history 604 can include user feedback signals from a most recently interacted-with playlist batch of short-form content items, and thus may include feedback signals that are on the order of seconds old.

Having retrieved the shorts events user history 604 from the real-time data store 636, online inferencing framework 600 can determine main-asset content items related to the interacted-with short-form content items s1, s1.1, s1.2, etc. Related main-asset content item determiner 605 can be configured to process the shorts events user history 604 to determine main-asset content items associated with the short-form content items that the user interacted with. For example, related main-asset content item determiner 605 can determine such information by looking up metadata 124 associated with the short-form content items to determine which main-asset content items the interacted-with short-form content items are associated with. Provided with this list of main-asset content items related to the interacted-with short-form content items, related main-asset content item user history fetcher 606 can retrieve, from the real-time data store 636 or another data store (not shown), user history data for main-asset content items that are determined to be related to the short-form content items referenced in the shorts events user history 604. Such user history data is illustrated in FIG. 6 as related main-asset events user history 610. Online inferencing framework can also retrieve, from the real-time data store 636 or another data store (not shown), a list of main-asset content items, in the media content service library, having short-form content items associated with them, as candidates 608.

Online sequence model 612 is a machine-learning model trained to predict user-relevant main-asset content items 614 based on the candidates 608, the related main-asset events user history 610, and the seed from the recommendation service 602 as separate inferencing inputs. For example, online sequence model 612 can be configured to rank the candidates 608 according to the user tastes and preferences reflected in the related main-asset events user history 610 and the seed from the recommendation service 602. The inferencing of the online sequence model 612 can be executed each time a new playlist batch of short-form content items is requested, e.g., each time an immediately previous playlist batch of short-form content items is exhausted or nearly exhausted. The seed can be provided to the online sequence model 612 as a centering value that reminds the online sequence model 612 about the significant initial explicit user feedback of choice of first short-form content item (s1 in the illustrated example) and an associated genre or topic it may represent. Apart from the seed, online sequence model 612 does not take into account explicit or implicit user feedback relating directly to the short-form content items interacted with by the user.

Although online inferencing framework 600 does not explicitly provide as an input to the framework lists of popular content items, as offline inferencing framework 500 does by providing popular shorts 512, online sequence model 612 can be inherently biased toward recommending main-asset content items that are popular amongst all users, because the more user feedback data exists for a particular main-asset content item, the more chances there are that the online sequence model 612 may output that particular main-asset content item as one of the relevant main-asset content items 614 (e.g., as a highly-ranked main-asset content item in a list of main-asset content items). Any main-asset content item that is new to the library of the media content service may have very little user history data associated with it. The online sequence model 612 may therefore be biased against ranking the new main-asset content items over more popular main-asset content items with more interactions as the relevant main-asset content items 614.

The online sequence model 612 can be implemented as any type of sequence model. As one example, the online sequence model 612 can be implemented as a deep neural network, such as a STAMP model. As another example, the online sequence model 612 can be implemented as a transformer network. In some examples, to avoid repetitive presentation of short-form content items in the final recommendations 652, the online sequence model 612 can also be configured not to select or rank highly any candidates 608 that are recently presented main-asset content items, as indicated by the related main-asset events user history 610.

As a result of its real-time inferencing, online sequence model 612 outputs identifiers of relevant main-asset content items 614, which can be a ranked list or selected ones of the candidates 608. From these identifiers of relevant main-asset content items 614, short-form content item determiner 616 can determine identifiers of relevant short-form content items 618 that are associated with (e.g., derived from) the relevant main-asset content items 614. In instances where multiple short-form content items are associated with a single one of the relevant main-asset content items 614, short-form content item determiner 616 can, in some examples, be configured to pick only one of the associated short-form content items for the one of the relevant main-asset content items for inclusion in the relevant short-form content items 618. For example, the short-form content item determiner 616 can be configured to the one of the associated short-form content items at random from among the available associated short-form content items.

In some examples of framework 600, a short-form content ranker 620 can rank the relevant short-form content items 618 in accordance with ranking criteria or using a ranking algorithm. For example, a multi-armed bandit (MAB) algorithm can be used to rank the relevant short-form content items 618 in order of popularity or conversion performance. As another example, a contextual MAB algorithm, such as a linear upper confidence bound (LinUCB) algorithm, can rank the relevant short-form content items 618 in a way that is personalized to the specific user for whom the short-form content recommendations 652 are being generated. In other examples, short-form content ranker 620 can rank the relevant short-form content items 618 in a random or semi-random fashion. In still other examples of framework 600, the ranking of the short-form content items 618 is left as the ranking of the corresponding main-asset content items 614 as performed by the online sequence model 612.

Whether re-ranked by short-form content ranker 620 or not, the online inferencing framework 600 can provide the relevant short-form content items 618 as its output short-form content recommendations 652, e.g., in the form of a next playlist batch in which the ranked order is used as the temporal playback order of the recommended short-form content items. The playlist batch 652 can comprise identifiers for a next ten, twenty, forty, or fifty short-form content items, as examples. A system server 126 generating the playlist batch 652 can direct one or more content servers 120 to serve the content identified by the playlist batch to a media system 104 of a corresponding user 132 in FIG. 1.

Although both the offline inferencing framework 500 and the online inferencing framework 600 utilize sequence models that learn from the sequences of user interactions with content items, only the online sequence model 612 in the online inferencing framework 600 is used for real-time inferencing as each playlist batch is requested (e.g., from a media system 104). By contrast, in the offline inferencing framework 500, the real-time operation lies in the fetching of recommendations from embeddings previously generated by the offline sequence model 504 outside of the real-time loop represented by framework 500. Another substantial difference between frameworks 500 and 600 is that framework 600 is configured to recommend only short-form content items that are associated with main-asset content items, and thus can be more useful in driving user engagement with main-asset content items. Framework 500 can, however, be adapted to substitute for main-asset content items and their associated events user histories other forms of content, products, or services, such that recommended short-form content items drive user engagement with the other forms of content, products, or services.

With reference again to FIGS. 1 and 3, short-form content engine 134 or 334 can implement framework 500 of FIG. 5, framework 600 of FIG. 6, or some fusion or combination of the two in order to provide short-form content recommendations 352. In some embodiments, for example, short-form content item options s1, s2, s3, etc. presented for initial user selection in a short-form content selection user interface (e.g., in row 406 in FIG. 4) can be generated using the online inferencing framework 600 of FIG. 6, while short-form content items s1.1, s1.2, etc., presented via the short-form content presentation user interface subsequent to the initial user selection can be generated using the offline inferencing framework 500 of FIG. 5.

Methods for Real-time Online Learning for Short-form Content Ranking

Figure 7:
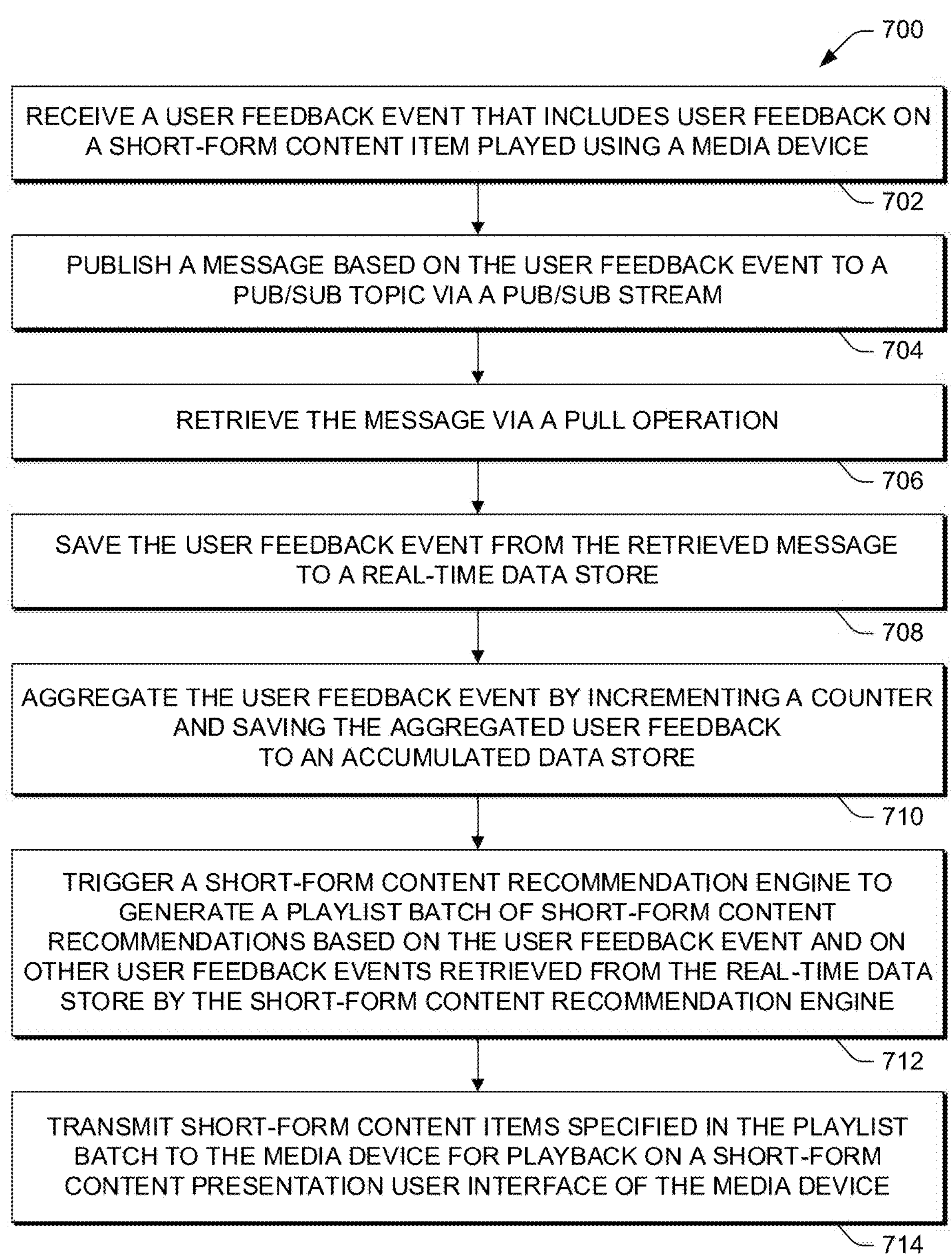
FIG. 7 illustrates a flow diagram of a method for real-time online learning for short-form content ranking, according to some embodiments.

FIG. 7 is a flowchart for a method 700 for real-time online learning for short-form content ranking, according to an embodiment. Method 700 can be performed by processing logic that can comprise hardware (e.g., circuitry, dedicated logic, programmable logic, microcode, etc.), software (e.g., instructions executing on a processing device), or a combination thereof. Not all steps may be needed to perform the disclosure provided herein. Further, some of the steps may be performed simultaneously, or in a different order than shown in FIG. 7. Method 700 shall be described with reference to FIG. 3. However, method 700 is not limited to that example embodiment.

In 702, a user feedback event is received. The user feedback event includes user feedback on a short-form content item played using a media device. The user feedback event can be received, for example, by shorts event service 340 of event relay service 338. The user feedback event can be received, for example, as an HTTP request.

In 704, a message based on the user feedback event to is published to a pub/sub topic via a pub/sub stream. The message can be published, for example, by shorts event service 340. The pub/sub topic can be, for example, pub/sub topic 344. The pub/sub topic can be made up of queues organized as partitions each held by a broker server of a pub/sub distributed messaging system. Each broker server can hold one or more partitions.

In 706, the message is retrieved via a pull operation. The message can be retrieved, for example, by event post-processing service 346. The message can be retrieved, for example, from a broker server of the pub/sub distributed messaging system.

In 708, the user feedback event from the retrieved message is saved to a real-time data store. The message can be saved, for example, by save service 348.

In 710, the user feedback event is aggregated by incrementing a counter and saving the aggregated user feedback to an accumulated data store. The user feedback event can be aggregated, for example, by aggregate service 350.

In 712, a short-form content recommendation engine, such as short-form content recommendation engine 334, is triggered to generate a playlist batch of short-form content recommendations. The playlist batch can be generated based on the user feedback event and on other user feedback events retrieved from the real-time data store by the short-form content recommendation engine.

In 714, short-form content items specified in the playlist batch are transmitted to the media device for playback on a short-form content presentation user interface of the media device. The media device can be, for example, an instance of media device 106 of FIG. 1.

In method 700, he receiving, the publishing, the retrieving, the triggering, and the transmitting happen within five seconds, e.g., within three seconds, e.g., within two seconds, e.g., within one second.

Figure 8:
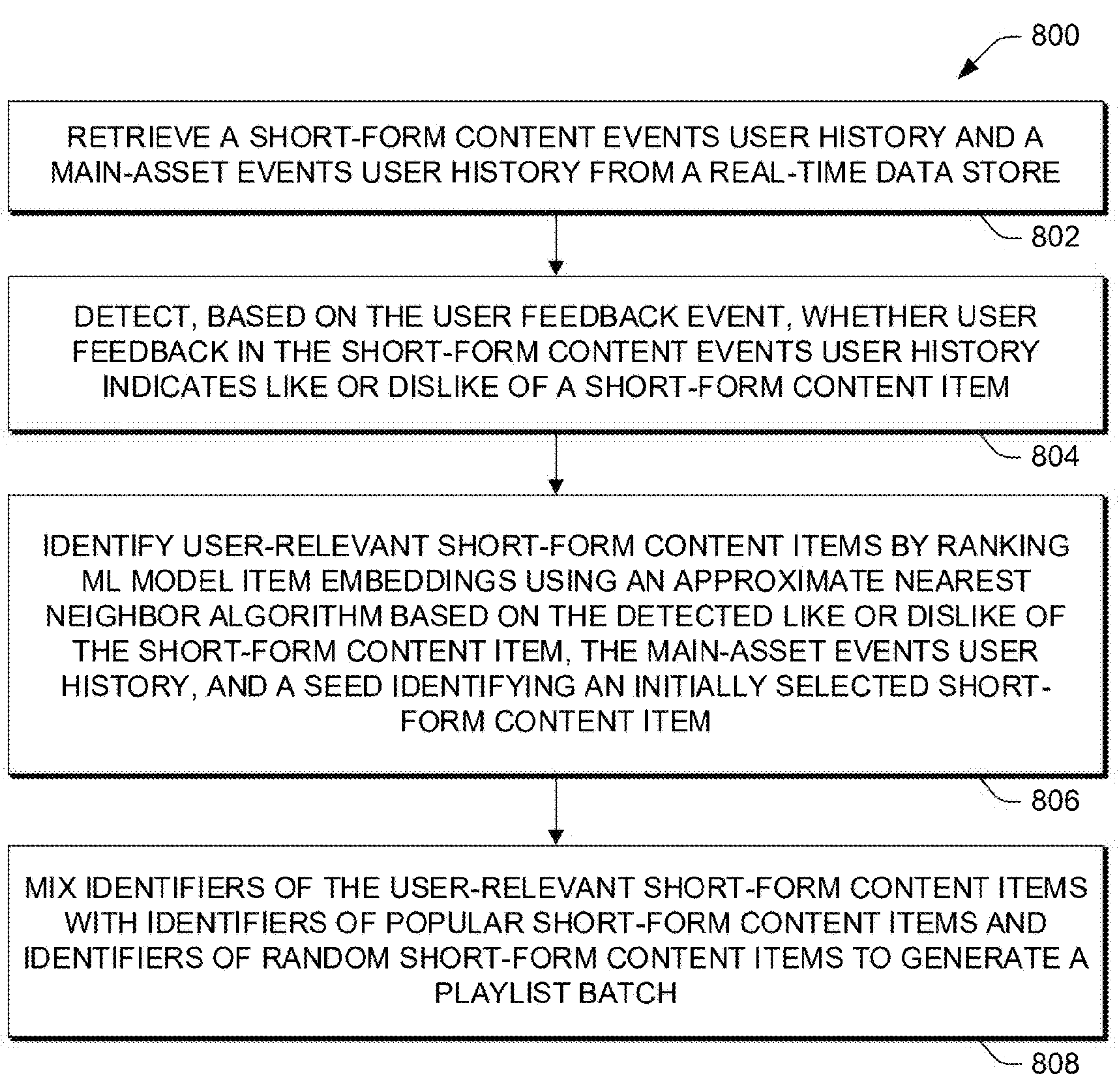
FIG. 8 illustrates a flow diagram of a method for generation of short-form content recommendations, according to some embodiments.

FIG. 8 is a flowchart for a method 800 for generating a playlist batch of short-form content recommendations, according to an embodiment. Method 800 can be performed by processing logic that can comprise hardware (e.g., circuitry, dedicated logic, programmable logic, microcode, etc.), software (e.g., instructions executing on a processing device), or a combination thereof. Method 800 can be performed, for example, by short-form content recommendation engine 134 of FIG. 1 or 334 of FIG. 3. Not all steps may be needed to perform the disclosure provided herein. Further, some of the steps may be performed simultaneously, or in a different order than shown in FIG. 8. Method 800 shall be described with reference to FIG. 5. However, method 800 is not limited to that example embodiment.

In 802, a short-form content events user history, such as shorts event user history 508, and a main-asset events user history, such as main-asset events user history 510, are retrieved from a real-time data store, such as real-time data store 536. The short-form content events user history can include a user feedback event. The user feedback event can include user feedback on a short-form content item played using a media device.

In 804, it is detected, based on the user feedback event, whether the user feedback (in the short-form events user history) indicates like or dislike of the short-form content item. This detection can be performed, for example, by user liked/disliked shorts detector 516. The detection can be performed, for example, by analyzing the shorts events user history 508 and applying applicable criteria, such as thresholds, as described above, to interpret "likes" and "dislikes" from data in the shorts events user history 508. For example, an event in the shorts events user history 508 indicating that the user terminated playback of a short-form content item in less than five seconds can be detected as a "dislike," whereas an event in the shorts events user history 508 indicating that the user did not prematurely terminate playback and permitted the short-form content item to play all the way through can be detected as a "like." The precise criteria or thresholds defining "likes" and "dislikes" can vary from embodiment to embodiment, and in some embodiments, the criteria or thresholds can be adaptive, such that they may vary from user to user or from time to time or from content item to content item for an individual user.

In 806, user-relevant short-form content items are identified by ranking ML model item embeddings, such as ML model item embeddings 506, using an approximate nearest neighbor algorithm, such as approximate nearest neighbor algorithm 518, based on the detected like or dislike of the short-form content item, the main-asset events user history, and a seed identifying an initially selected short-form content item. The initially selected short-form content item can be one that is selected by a user from a short-form content selection user interface, e.g., s1 in FIG. 5. The machine-learning model item embeddings can each be representative of a respective content item. The machine-learning model item embeddings can generated, for example, by inferencing of an offline sequence model, such as offline sequence model 504.

In 808, the playlist batch is generated by mixing identifiers of the user-relevant short-form content items, identifiers of short-form content items determined to be popular among a plurality of users of a media content service, and identifiers of randomly-selected short-form content items. The randomly-selected short-form content items can, for example, be selected from among newer short-form content items recently added to the library of the media content service, or otherwise from among short-form content items for which little user feedback data has yet been collected and stored in real-time data store 536. The mixing can be performed, for example, by shorts merger 522. For example, the mixing can be done by mixing the identifiers of the user-relevant short-form content items, the identifiers of the short-form content items determined to be popular among a plurality of users, and the identifiers of the randomly-selected short-form content items in predetermined or adaptive proportions. For example, the mixing can be done by randomly interposing the identifiers of the short-form content items determined to be popular among a plurality of users and the identifiers of the randomly-selected short-form content items among the identifiers of the user-relevant short-form content items.

Figure 9:
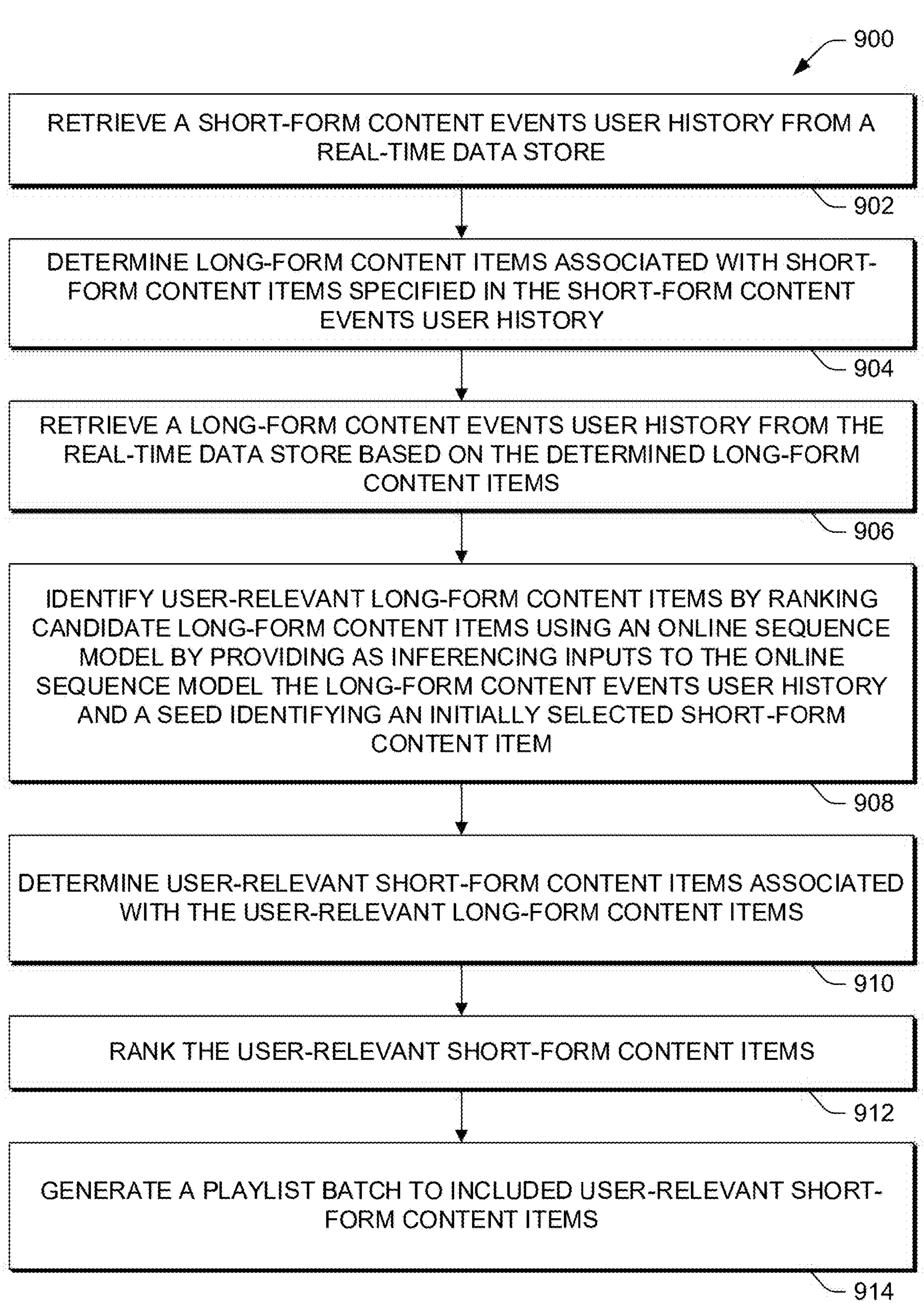
FIG. 9 illustrates a flow diagram of a method for generation of short-form content recommendations, according to some embodiments.

FIG. 9 is a flowchart for a method 900 for generating a playlist batch of short-form content recommendations, according to an embodiment. Method 900 can be performed by processing logic that can comprise hardware (e.g., circuitry, dedicated logic, programmable logic, microcode, etc.), software (e.g., instructions executing on a processing device), or a combination thereof. Method 900 can be performed, for example, by short-form content recommendation engine 134 of FIG. 1 or 334 of FIG. 3. Not all steps may be needed to perform the disclosure provided herein. Further, some of the steps may be performed simultaneously, or in a different order than shown in FIG. 9. Method 900 shall be described with reference to FIG. 6. However, method 900 is not limited to that example embodiment.

In 902, a short-form content events user history, such as shorts event user history 604, is retrieved from a real-time data store, such as real-time data store 636. The short-form content events user history can include a user feedback event. The user feedback event can include user feedback on a short-form content item played using a media device.

In 904, long-form content items associated with short-form content items specified in the short-form content events user history are determined. For example, the long-form content items can be determined by related main-asset content item determiner 605. For example, for each short-form content item referenced in the short-form content events user history, it can be determined which long-form content item, if any, is associated with the respective short-form content item. Each of the long-form content items have a longer playback duration than respective ones of the short-form content items specified in the short-form content events user history.

In 906, a long-form content events user history is retrieved from the real-time data store based on the determined long-form content items. For example, the long-form content events user history can be retrieved by the related main-asset content item user history fetcher 606.

In 908, user-relevant long-form content items are identified by ranking candidate long-form content items using an online sequence model by providing as inferencing inputs to the online sequence model the long-form content events user history and a seed identifying an initially selected short-form content item. The initially selected short-form content item can be one that is selected by a user from a short-form content selection user interface, e.g., s1 in FIG. 6. The online sequence model can be, for example, online sequence model 612. The candidate long-form content items can be retrieved from a data store, such as the real-time data store 636 or another data store.

In 910, user-relevant short-form content items associated with the user-relevant long-form content items are determined. For example, the user-relevant short-form content items can be determined by short-form content item determiner 616.

In 912, the user-relevant short-form content items are ranked, e.g., by short-form content ranker 620. The ranking can be performed, for example, by a MAB algorithm or a contextual MAB algorithm such as a LinUCB algorithm. In some examples, the ranking can be done in a random or semi-random fashion.

In 914, a playlist batch comprising identifiers of the user-relevant short-form content items is generated. For example, the playlist batch can consist of the identifiers of the relevant short-form content items 618, either unranked or as ranked.

The generation of the playlist batch in 712 of method 700 can be performed using method 800, method 900, or some fusion or combination thereof. The methods 700, 800, and 900, each alone or in combination, provide improvements to the field of short-form content recommendations by speeding the generations of playlist batches, e.g., such that they are in real time, e.g., in less than five seconds, e.g., less than three seconds, e.g., less than two seconds, e.g., less than one second.

Example Computer System

Figure 10:
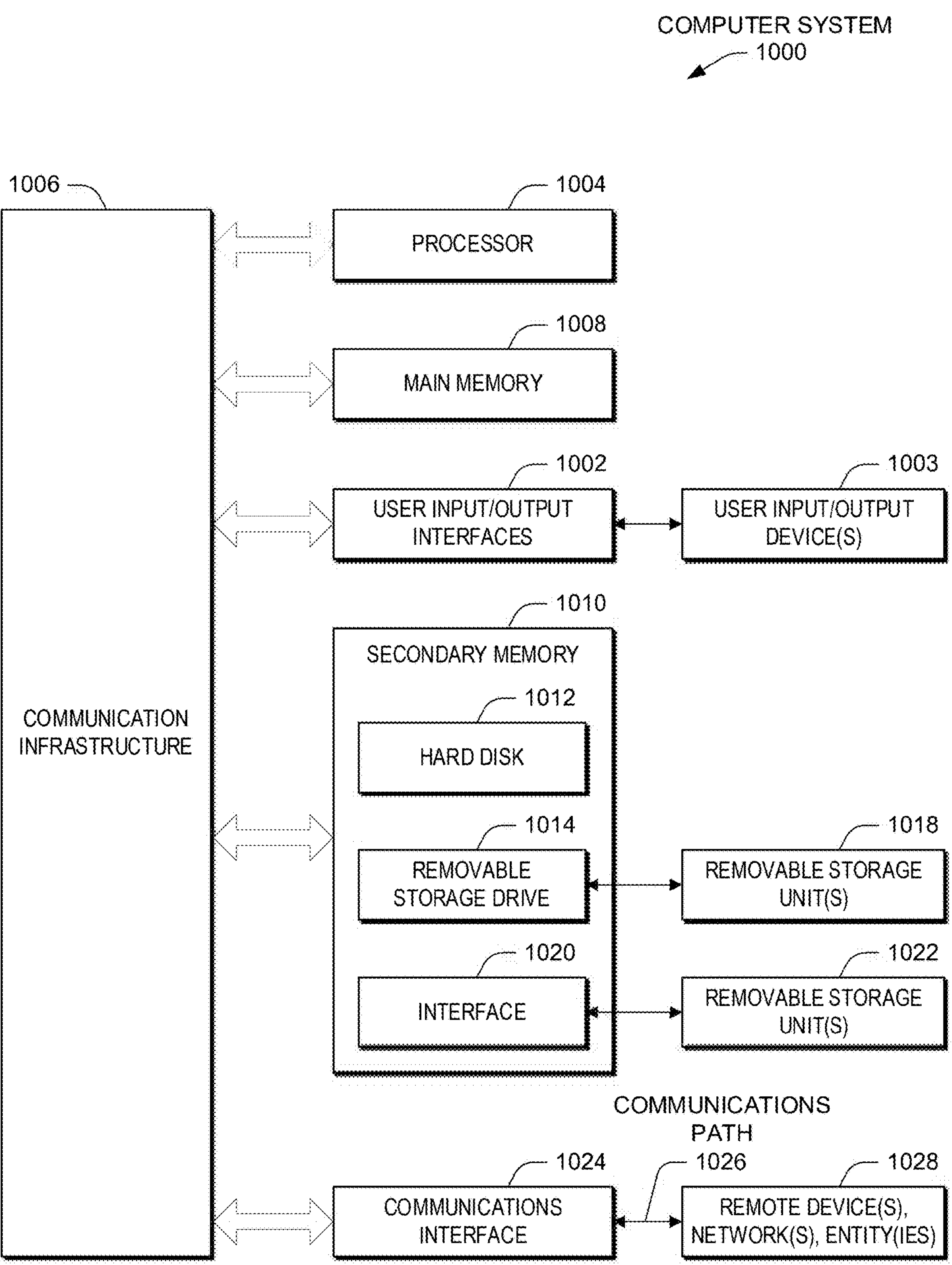
FIG. 10 illustrates an example computer system useful for implementing various embodiments.

Various embodiments may be implemented, for example, using one or more well-known computer systems, such as computer system 1000 shown in FIG. 10. For example, the media device 106, the one or more content servers 120, the one or more system servers 126, and/or the one or more pub/sub broker servers 140 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU) or a neural processing unit (NPU). In an embodiment, a GPU or NPU may be a processor that is a specialized electronic circuit designed to process mathematically intensive applications. The GPU or NPU may have a parallel structure that is efficient for parallel processing of large blocks of data, such as mathematically intensive data common to computer graphics applications, machine learning application, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/or any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference numeral 1028). For example, communication interface 1024 may allow computer system 1000 to communicate with external or remote devices 1028 over communications path 1026, which may be wired and/or wireless (or a combination thereof), and which may include any combination of LANs, WANs, the internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smartphone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premises" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Conclusion

More recent user behavior is often the most valuable information on which to base content recommendation, as it can be more indicative as to what types of content the user may be more likely to want to watch next. When user feedback pipeline latency causes a delay in recommendation generation, the generated recommendations may not be as accurate as they would be if they were able to factor in more recent user feedback information. The recommendation systems, methods, and computer-readable media described herein can reduce latency and improve the accuracy of generated recommendations.

Recommendation systems, methods, and computer-readable media as described herein are enabled real-time online learning capable of inferring content delivery service user taste, intent, and/or behavior in short-form content consumption contexts. Recommendation systems, methods, and computer-readable media thus receive, with latency low enough to support revised recommendations within a single short-form content viewing session, user feedback information that can encompass nuances such as which type(s) of short-form content currently appeals to the user in the current context, current streaming behavior of the user, which short-form content items in the current session the user plays completely and which content items the user skips more often. This information helps the recommendation systems, methods, and computer-readable media make more informed decisions to curate the user experience in ways that are enhanced over existing recommendation systems.

The Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer-implemented method for real-time online learning for short-form content ranking, the computer-implemented method comprising:

receiving, by at least one computer processor, a user feedback event that includes user feedback on a short-form content item played using a media device;

publishing a message based on the user feedback event to a publish-subscribe (pub/sub) topic via a pub/sub stream, the pub/sub topic comprising queues organized as partitions each held by a broker server of a pub/sub distributed messaging system, each broker server holding one or more partitions;

retrieving the message via a pull operation;

saving the user feedback event from the retrieved message to a real-time data store;

triggering a short-form content recommendation engine to generate a playlist batch of short-form content recommendations based on the user feedback event and on other user feedback events retrieved from the real-time data store by the short-form content recommendation engine; and transmitting short-form content items specified in the playlist batch to the media device for playback on a short-form content presentation user interface of the media device, wherein the receiving, the publishing, the retrieving, the triggering, and the transmitting happen within five seconds.

2. The computer-implemented method of claim 1, wherein the receiving, the publishing, the retrieving, the triggering, and the transmitting happen within three seconds.

3. The computer-implemented method of claim 1, wherein the receiving, the publishing, the retrieving, the triggering, and the transmitting happen within one second.

4. The computer-implemented method of claim 1, wherein the user feedback event is received from the media device as a Hypertext Transfer Protocol (HTTP) request.

5. The computer-implemented method of claim 4, wherein the message is published to the pub/sub topic by an event relay service without any processing of the HTTP request prior to placing the message into the pub/sub stream, and without any persistence of the HTTP request within the event relay service.

6. The computer-implemented method of claim 1, wherein the generating the playlist batch of short-form content recommendations by the short-form content recommendation engine comprises:

retrieving a short-form content events user history and a main-asset events user history from the real-time data store, the short-form content events user history comprising the user feedback event;

detecting, based on the user feedback event, whether the user feedback on the short-form content item indicates like or dislike of the short-form content item; and identifying user-relevant short-form content items by ranking machine-learning model item embeddings using an approximate nearest neighbor algorithm based on the detected like or dislike of the short-form content item, the main-asset events user history, and a seed identifying an initially selected short-form content item that is selected by a user from a short-form content selection user interface, the machine-learning model item embeddings each representative of a respective content item, the machine-learning model item embeddings generated by inferencing of an offline sequence model, wherein the playlist batch comprises identifiers of the user-relevant short-form content items, identifiers of short-form content items determined to be popular among a plurality of users, and identifiers of randomly-selected short-form content items.

7. The computer-implemented method of claim 1, wherein the generating the playlist batch of short-form content recommendations by the short-form content recommendation engine comprises:

retrieving a short-form content events user history from the real-time data store, the short-form content events user history comprising the user feedback event;

determining long-form content items associated with short-form content items specified in the short-form content events user history, each of the long-form content items having a longer playback duration than respective ones of the short-form content items specified in the short-form content events user history;

retrieving a long-form content events user history from the real-time data store based on the long-form content items;

identifying user-relevant long-form content items by ranking candidate long-form content items using an online sequence model by providing as inferencing inputs to the online sequence model the long-form content events user history and a seed identifying an initially selected short-form content item that is selected by a user from a short-form content selection user interface; and determining user-relevant short-form content items associated with the user-relevant long-form content items, wherein the playlist batch comprises identifiers of the user-relevant short-form content items.

8. A system, comprising:

one or more memories; and at least one processor each coupled to at least one of the memories and configured to perform operations comprising:

receiving a user feedback event that includes user feedback on a short-form content item played using a media device;

publishing a message based on the user feedback event to a publish-subscribe (pub/sub) topic via a pub/sub stream, the pub/sub topic comprising queues organized as partitions each held by a broker server of a pub/sub distributed messaging system, each broker server holding one or more partitions;

retrieving the message via a pull operation;

saving the user feedback event from the retrieved message to a real-time data store;

triggering a short-form content recommendation engine to generate a playlist batch of short-form content recommendations based on the user feedback event and on other user feedback events retrieved from the real-time data store by the short-form content recommendation engine; and transmitting short-form content items specified in the playlist batch to the media device for playback on a short-form content presentation user interface of the media device, wherein the receiving, the publishing, the retrieving, the triggering, and the transmitting happen within five seconds.

9. The system of claim 8, wherein the receiving, the publishing, the retrieving, the triggering, and the transmitting happen within three seconds.

10. The system of claim 8, wherein the receiving, the publishing, the retrieving, the triggering, and the transmitting happen within one second.

11. The system of claim 8, wherein the user feedback event is received from the media device as a Hypertext Transfer Protocol (HTTP) request.

12. The system of claim 11, wherein the message is published to the pub/sub topic by an event relay service without any processing of the HTTP request prior to placing the message into the pub/sub stream, and without any persistence of the HTTP request within the event relay service.

13. The system of claim 8, wherein the generating the playlist batch of short-form content recommendations by the short-form content recommendation engine comprises:

retrieving a short-form content events user history and a main-asset events user history from the real-time data store, the short-form content events user history comprising the user feedback event;

detecting, based on the user feedback event, whether the user feedback on the short-form content item indicates like or dislike of the short-form content item; and identifying user-relevant short-form content items by ranking machine-learning model item embeddings using an approximate nearest neighbor algorithm based on the detected like or dislike of the short-form content item, the main-asset events user history, and a seed identifying an initially selected short-form content item that is selected by a user from a short-form content selection user interface, the machine-learning model item embeddings each representative of a respective content item, the machine-learning model item embeddings generated by inferencing of an offline sequence model, wherein the playlist batch comprises identifiers of the user-relevant short-form content items, identifiers of short-form content items determined to be popular among a plurality of users, and identifiers of randomly-selected short-form content items.

14. The system of claim 8, wherein the generating the playlist batch of short-form content recommendations by the short-form content recommendation engine comprises:

retrieving a short-form content events user history from the real-time data store, the short-form content events user history comprising the user feedback event;

determining long-form content items associated with short-form content items specified in the short-form content events user history, each of the long-form content items having a longer playback duration than respective ones of the short-form content items specified in the short-form content events user history;

retrieving a long-form content events user history from the real-time data store based on the long-form content items;

identifying user-relevant long-form content items by ranking candidate long-form content items using an online sequence model by providing as inferencing inputs to the online sequence model the long-form content events user history and a seed identifying an initially selected short-form content item that is selected by a user from a short-form content selection user interface; and determining user-relevant short-form content items associated with the user-relevant long-form content items, wherein the playlist batch comprises identifiers of the user-relevant short-form content items.

15. One or more non-transitory computer-readable media having instructions stored thereon that, when executed by at least one computing device, cause the at least one computing device to perform operations comprising:

receiving a user feedback event that includes user feedback on a short-form content item played using a media device;

publishing a message based on the user feedback event to a publish-subscribe (pub/sub) topic via a pub/sub stream, the pub/sub topic comprising queues organized as partitions each held by a broker server of a pub/sub distributed messaging system, each broker server holding one or more partitions;

retrieving the message via a pull operation;

saving the user feedback event from the retrieved message to a real-time data store;

triggering a short-form content recommendation engine to generate a playlist batch of short-form content recommendations based on the user feedback event and on other user feedback events retrieved from the real-time data store by the short-form content recommendation engine; and transmitting short-form content items specified in the playlist batch to the media device for playback on a short-form content presentation user interface of the media device, wherein the receiving, the publishing, the retrieving, the triggering, and the transmitting happen within five seconds.

16. The one or more non-transitory computer-readable media of claim 15, wherein the receiving, the publishing, the retrieving, the triggering, and the transmitting happen within three seconds.

17. The one or more non-transitory computer-readable media of claim 15, wherein the user feedback event is received from the media device as a Hypertext Transfer Protocol (HTTP) request.

18. The one or more non-transitory computer-readable media of claim 17, wherein the message is published to the pub/sub topic by an event relay service without any processing of the HTTP request prior to placing the message into the pub/sub stream, and without any persistence of the HTTP request within the event relay service.

19. The one or more non-transitory computer-readable media of claim 15, wherein the generating the playlist batch of short-form content recommendations by the short-form content recommendation engine comprises:

retrieving a short-form content events user history and a main-asset events user history from the real-time data store, the short-form content events user history comprising the user feedback event;

detecting, based on the user feedback event, whether the user feedback on the short-form content item indicates like or dislike of the short-form content item; and identifying user-relevant short-form content items by ranking machine-learning model item embeddings using an approximate nearest neighbor algorithm based on the detected like or dislike of the short-form content item, the main-asset events user history, and a seed identifying an initially selected short-form content item that is selected by a user from a short-form content selection user interface, the machine-learning model item embeddings each representative of a respective content item, the machine-learning model item embeddings generated by inferencing of an offline sequence model, wherein the playlist batch comprises identifiers of the user-relevant short-form content items, identifiers of short-form content items determined to be popular among a plurality of users, and identifiers of randomly-selected short-form content items.

20. The one or more non-transitory computer-readable media of claim 15, wherein the generating the playlist batch of short-form content recommendations by the short-form content recommendation engine comprises:

retrieving a short-form content events user history from the real-time data store, the short-form content events user history comprising the user feedback event;

determining long-form content items associated with short-form content items specified in the short-form content events user history, each of the long-form content items having a longer playback duration than respective ones of the short-form content items specified in the short-form content events user history;

retrieving a long-form content events user history from the real-time data store based on the long-form content items;

identifying user-relevant long-form content items by ranking candidate long-form content items using an online sequence model by providing as inferencing inputs to the online sequence model the long-form content events user history and a seed identifying an initially selected short-form content item that is selected by a user from a short-form content selection user interface; and determining user-relevant short-form content items associated with the user-relevant long-form content items, wherein the playlist batch comprises identifiers of the user-relevant short-form content items.

* * * * *